(12) United States Patent
Abeta et al.

(10) Patent No.: US 7,522,924 B2
(45) Date of Patent: Apr. 21, 2009

(54) SLOT ALLOCATION APPARATUS AND SLOT ALLOCATION METHOD

(75) Inventors: Sadayuki Abeta, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 76 days.

(21) Appl. No.: 11/197,401

(22) Filed: Aug. 5, 2005

(65) Prior Publication Data

US 2006/0034239 A1 Feb. 16, 2006

(30) Foreign Application Priority Data

Aug. 10, 2004 (JP) ............................. 2004-233673

(51) Int. Cl.
*H04W 72/00* (2006.01)
(52) U.S. Cl. ................. 455/452.2; 455/452.1; 455/450; 455/451; 455/453; 455/67.11; 455/67.13; 455/561; 455/502; 455/509; 455/512; 455/513; 370/329; 370/330; 370/332; 370/336; 370/341; 370/343; 370/345; 370/350; 370/431; 370/442; 370/444
(58) Field of Classification Search ......... 455/450–451, 455/452.1–2, 453, 67.11, 13, 561, 67.13, 455/507–516, 500, 502; 370/328–333, 336–337, 370/341–350, 431, 442, 444
See application file for complete search history.

(56) References Cited

U.S. PATENT DOCUMENTS 6,016,311 A 1/2000 Gilbert et al.
6,134,227 A 10/2000 Magana
2002/0173277 A1 11/2002 Takao et al.
2004/0176097 A1* 9/2004 Wilson et al. ............ 455/452.2

FOREIGN PATENT DOCUMENTS

| CN | 1386024 A | 12/2002 |
|---|---|---|
| DE | 199 01 755 A1 | 8/2000 |
| EP | 1 259 092 | * 11/2002 |
| EP | 1 259 092 A2 | 11/2002 |
| EP | 1 437 847 A1 | 7/2004 |
| JP | 8-186533 | 7/1996 |
| JP | 11-234242 | 8/1999 |
| WO | WO 99/26437 | 5/1999 |

* cited by examiner

*Primary Examiner*—Tuan A Tran
(74) *Attorney, Agent, or Firm*—Oblon, Spivak, McClelland, Maier & Neustadt, P.C.

(57) ABSTRACT

A slot allocation apparatus for allocating slots in communicating with plural mobile stations in accordance with FDD/TDD scheme includes (a) traffic property detecting apparatus for detecting a property of input traffic; (b) slot allocation priority determining apparatus for determining which of an uplink and a downlink should be given a higher priority for the slot allocation, based on a priority of the traffic derived from the detected property of the input traffic; and (c) slot allocating apparatus for allocating the uplink and downlink slots for the mobile stations, based on the determination result.

13 Claims, 21 Drawing Sheets

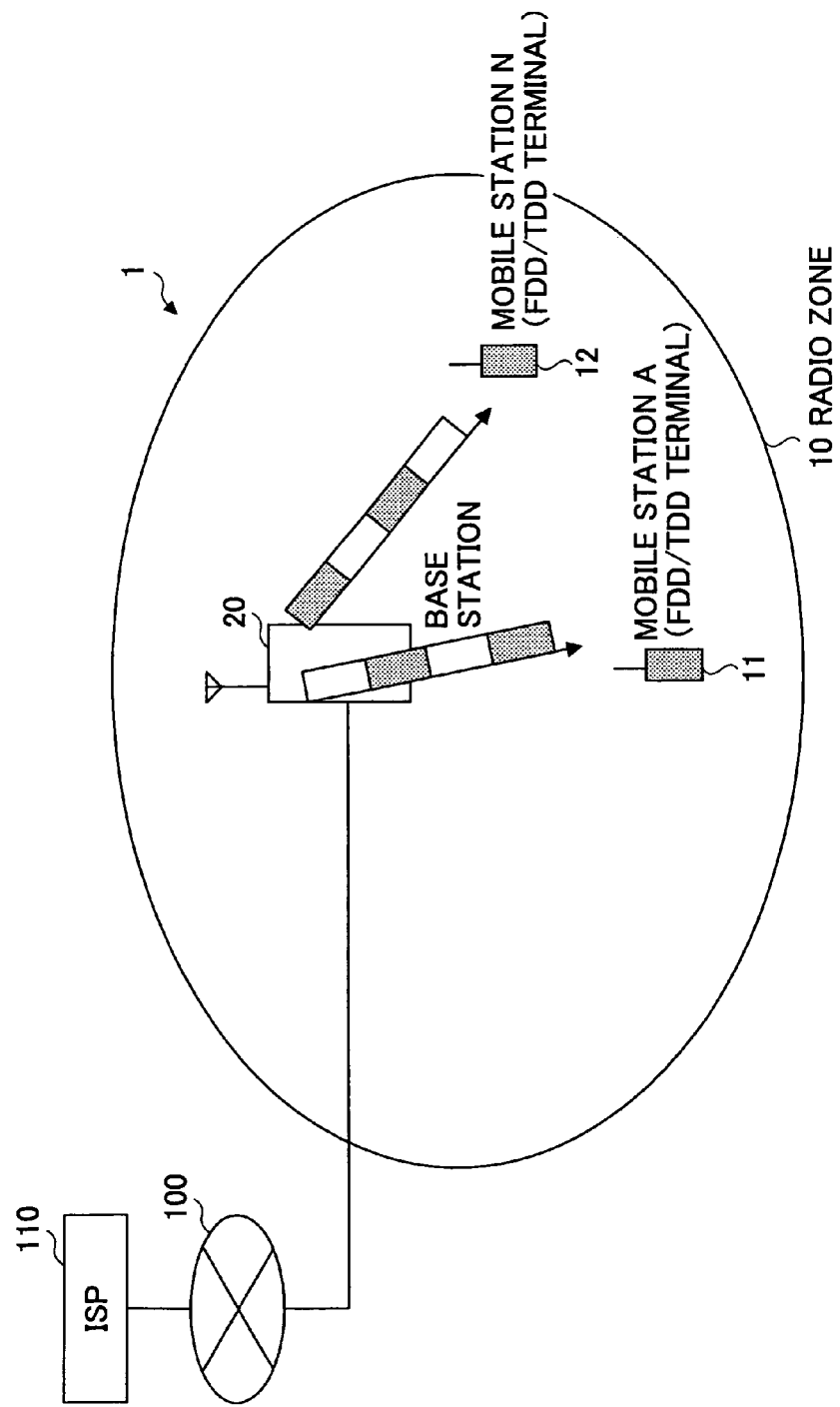

FIG.3A

SLOT ALLOCATION METHOD BY FDD/TDD ACCORDING TO PRIOR ART

| BASE STATION | A (TRANSMISSION) | B (TRANSMISSION) | ... | N (TRANSMISSION) | A (TRANSMISSION) |
|---|---|---|---|---|---|
| MOBILE STATION A | RECEPTION | TRANSMISSION | | | |
| MOBILE STATION N | | | | RECEPTION | TRANSMISSION |

FIG.3B

SLOT ALLOCATION METHOD BY FDD/TDD ACCORDING TO THE PRESENT INVENTION

| BASE STATION | A (TRANSMISSION) | B (TRANSMISSION) | TRANSMISSION | ... | N (TRANSMISSION) | A (TRANSMISSION) | TRANSMISSION |
|---|---|---|---|---|---|---|---|
| MOBILE STATION A | RECEPTION | | | | | RECEPTION | TRANSMISSION |
| MOBILE STATION N | | | | | RECEPTION | TRANSMISSION | |

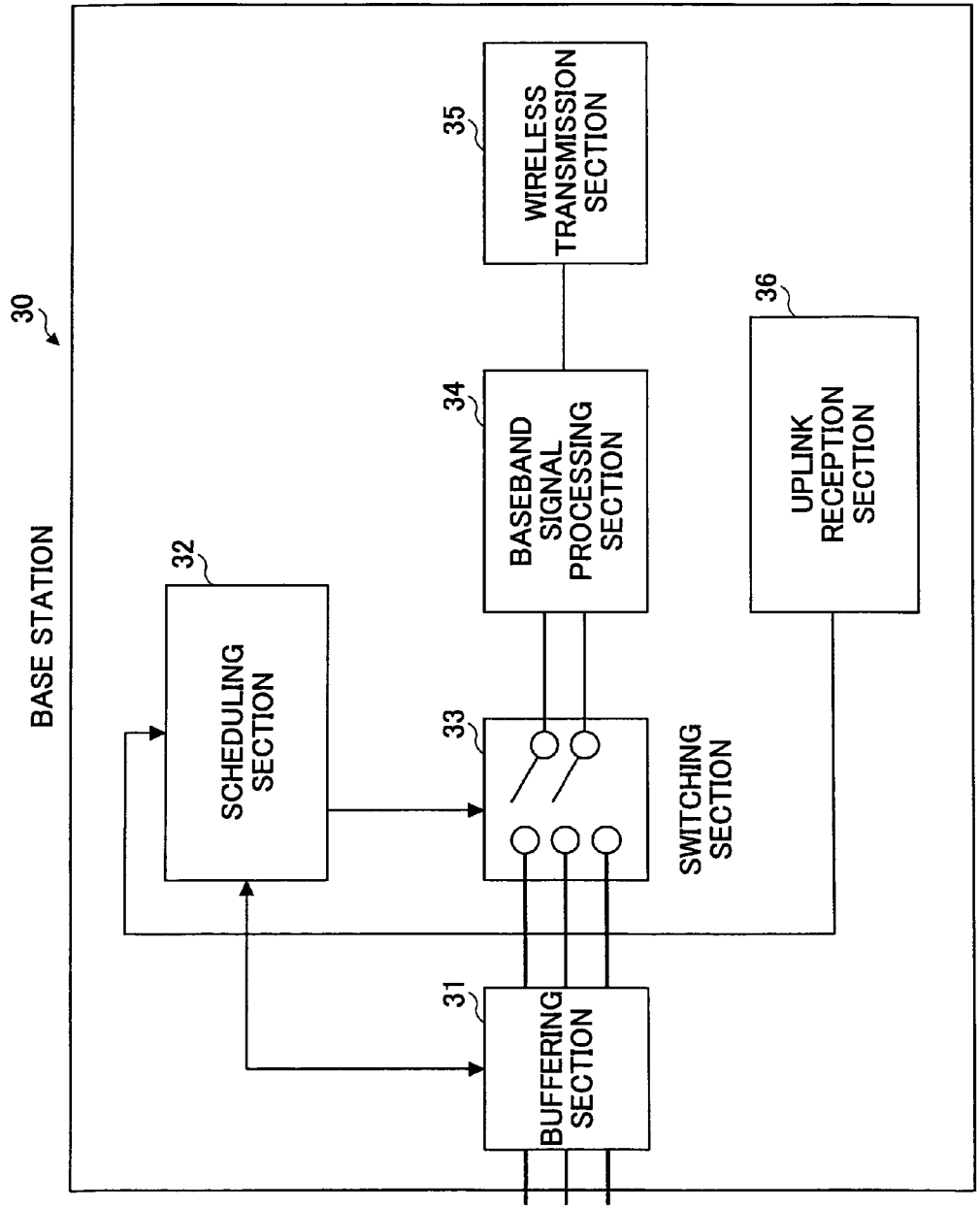

FIG.13

| MOBILE STATION ID | UPLINK TRAFFIC QoS | DOWNLINK TRAFFIC QoS | CHANNEL STATUS | RANKING | SLOT 1 | SLOT 2 | SLOT 3 | ... |
|---|---|---|---|---|---|---|---|---|
| a | 1 | 1 | 1 | 1 | ○ | ○ | | |
| b | 1 | 1 | 2 | 2 | | ● | | |

200 201 202 203 204 205

SLOT ALLOCATION APPARATUS AND SLOT ALLOCATION METHOD

FIELD OF THE INVENTION

The present invention generally relates to a slot allocation apparatus and a slot allocation method in a FDD/TDD scheme of a communication system.

BACKGROUND OF THE INVENITON

In order to implement simultaneous bidirectional communications (duplex transmissions) in a mobile communication system, a downlink channel from a base station to a mobile station (for example, a mobile phone) and an uplink channel from a mobile station to a base station are necessary. As for duplex schemes, there are two, that is, the FDD (Frequency Division Duplex) scheme in which uplink and downlink are separated by frequency and the TDD (Time Division Duplex) scheme in which uplink and downlink with the same frequency are separated by time.

In addition, the uplink channel and the downlink channel consist of frames, where one frame is divided in time, and constructed by plural timeslots (abbreviated as a slot hereafter).

Now, an overview of the aforementioned FDD scheme and the TDD scheme is provided referring to FIGS. 1A and 1B, and an overview of the FDD/TDD scheme adopted in PDC (Personal Digital Cellular), which has been commercialized in Japan, and in GSM (Global System for Mobile communications), in use in Europe is provided.

First, an overview of an FDD scheme is provided referring to FIG. 1A. FIG. 1A shows an example of frame configuration in the FDD scheme.

The FDD scheme is adopted in IMT-2000 (the third generation mobile communication system) represented in W-CDMA or cdma2000, in which the transmission (the reception) of the uplink slot during the transmission (the reception) of the downlink slot is possible because frequencies in up and down directions (f1, f2) are different from each other.

In a mobile communication system in which the FDD scheme is used, a communication band for the downlink channel from the base station to mobile station and a communication band for the uplink channel from the mobile station to the base station are separated from each other, so the separation between the up and down signals is implemented by providing the transmission and reception sections of the base station and the mobile station with filters (duplexers) for preventing interference between the transmit signal and the receive signal.

However, because the duplexer is an analog circuit, it is difficult to be miniaturized, leading to an obstacle to miniaturization of mobile telephones.

Next, an overview of the TDD scheme is provided referring to FIG. 1B. FIG. 1B shows an example of frame configuration in the TDD scheme.

The TDD scheme, which has been adopted in mobile communication systems such as PHS, doesn't require the duplexer because transmissions in the uplink and the downlink are performed at one frequency (f0). However, in the TDD scheme the transmission cannot be performed during the reception. Further, since the same frequency is used in the uplink and the downlink, it is necessary to maintain synchronization between the respective base stations. Thus, such a cellular system supporting an area ranging from several hundreds of m to several km tends to have a drawback in that it is easily subjected to influence of propagation delay, etc.

Next, an overview of the FDD/TDD scheme is provided referring to FIG. 1C. FIG. 1C shows an example of frame configuration in the FDD/TDD scheme.

The FDD/TDD scheme, in which separate frequencies are used for the transmission and reception and the transmission timing is different from the reception timing, doesn't require a duplexer. This is based on the fact that the PDC and GSM are systems predicated on line switching such as voice communication, and that the transmission timing and the reception timing are periodically constant.

By the way, it is believed that the leading requirement for future service will change from voice calls to data communication (packet transmission) such as on the Internet. In such a case, characteristics of the traffic can be expected to be such that the uplink channel will be used only for requesting information while the downlink channel is used for transferring massive amounts of data compared with the uplink channel, such as music, image, and picture. In other words, there is a need for a duplex scheme suited for Internet access with asymmetric traffic.

For this reason, a communication system using a CDMA-TDD scheme is proposed, which can accommodate the communication of the asymmetric information quantity of up and down lines effectively by controlling the number of time slots to be allocated for the respective up and down lines according to the total sum of the information quantity of the respective up and down lines (See, for example, JP11-234242 A publication.).

Further, from a similar viewpoint, a mobile communication system using the TDD scheme is proposed, which can perform smooth time division duplex communication by changing the slot interval ratio of an up line and a down line between a base station and a mobile station (See, for example, JP8-186533 A publication.).

As mentioned above, the conventional FDD/TDD scheme is suitable for line switching, that is, the communication in which information quantity is the same bidirectionally, such as voice communication, and in the conventional FDD/TDD scheme timing of transmission and reception is fixed in the system. Therefore, for asymmetric communications in up and down directions, there is a problem in that a flexible slot allocation cannot be implemented in the conventional FDD/TDD scheme.

In addition, according to the aforementioned publications, in the TDD scheme an effective accommodation is enabled by allocating time slots to the respective up and down lines according to the information quantity of the respective up and down lines, or in the TDD scheme frequency utilization efficiency is improved by changing the slot interval ratio of an up line and a down line according to the difference in information quantity between up and down lines; however, no description concerning the slot allocation in the case of the FDD/TDD scheme can be found in these publications.

On the other hand, since miniaturization of size in device-scale as well as improved performance are demanded for the fourth generation mobile communication system, a FDD/TDD scheme which doesn't require duplexers is expected to be developed as a duplex scheme which enables miniaturization of the equipment.

SUMMARY OF THE INVENTION

Therefore, it is an object of the present invention to solve the problems in the conventional techniques and to provide a slot allocation apparatus and a slot allocation algorithm that can allocate slots of the uplink and downlink flexibly according to the status of traffic, etc., in a communication system using a FDD/TDD scheme.

In order to solve the problems, according to one aspect of the invention, a slot allocation apparatus is provided for allocating slots in communicating with plural mobile stations in accordance with a FDD/TDD scheme, which slot allocation apparatus comprises:

(a) traffic property detecting means for detecting a property of input traffic;
(b) slot allocation priority determining means for determining which of an uplink and a downlink should be given a higher priority for the slot allocation, based on a priority of the traffic derived from the detected property of the input traffic; and
(c) slot allocating means for allocating the uplink and downlink slots for the mobile stations based on the determination result.

Preferably, the traffic property detecting means inputs the uplink and downlink traffic as the input traffic, and detects the priority of the traffic, based on quality of service demanded by the respective input traffic.

Preferably, the quality of service is represented by allowable delay time, allowable or required IP loss rate, information rate, amount of information, user information, performance of the party on the other end, or any combination thereof.

Preferably, the slot allocation apparatus further comprises channel status estimating means for estimating a channel status based on the signal received from the mobile station, wherein the slot allocation priority determining means considers the quality of service and the channel status in determining which of the uplink and downlink should be given a higher priority for the slot allocation.

Preferably, if the uplink and downlink are of the same priority concerning the traffic, the downlink is given a higher priority for the slot allocation in the case of the channel status being estimated to be good, while the uplink is given a higher priority for the slot allocation in the case of the channel status being estimated to be bad.

Preferably, the channel status is represented by quality of reception, direction of arrival from the mobile station, uplink transmission power, delay spreading, Doppler frequency, multi-path number, or any combination thereof.

Preferably, transmission power control, adaptive modulation control, automatic repeat and request control or any combination thereof is applied in allocating the uplink and downlink slots for the mobile stations.

Preferably, the slot allocating means allocates plural users to the same slot using sub-carriers used in multi-carrier transmission, a part of the bandwidth in whole band, or spread codes used in CDMA transmission in allocating slots for the uplink and downlink.

Preferably, the slot allocation apparatus further comprises means for allocating a common control channel to the slots of the downlink in succession.

Preferably, the slot allocation apparatus is able to communicate with a FDD scheme-applied mobile station, and the slot allocation apparatus further comprises means for allocating the uplink slot to the FDD scheme applied mobile station at the timing of the downlink slot of the common control channel allocated for the FDD/TDD scheme-applied mobile station, in the case where the FDD scheme-applied mobile station and the FDD/TDD scheme-applied mobile station are mixed in a predetermined radio zone.

In another aspect of the invention, a slot allocation method for a mobile communication system in which communication between a mobile station and a base station is performed in accordance with FDD/TDD scheme, comprises the steps of:

(a) inputting uplink and downlink traffic to recognize quality of service demanded by the respective input traffic;
(b) detecting priority of the traffic based on the recognition;
(c) determining which of an uplink slot and a downlink slot should be given a higher priority for the slot allocation, based on the detected priority of the traffic; and
(d) allocating the uplink slot or the downlink slot for the mobile station based on the determination result.

With the aforementioned aspects of the invention, since the slot allocation is performed in consideration of the priority of the uplink and the downlink, the flexible slot allocation according to the status of traffic, etc., can be implemented, thus enabling the simplification of the hardware configuration of the mobile station without reducing the accommodation efficiency of the traffic.

BRIEF DESCRIPTION OF THE DRAWINGS

Other objects, features, and advantages of the invention will become more apparent from the following detailed description when read in conjunction with the accompanying drawings, in which

FIG. 2 is a schematic diagram showing the configuration of a communication system according to the present embodiment;

FIGS. 3A and 3B are diagrams showing a slot allocation method by a FDD/TDD scheme according to the present invention in contradistinction to prior art;

FIG. 4 is a functional block diagram of a configuration example of the base station according to the present embodiment;

FIG. 13 is an example of a slot allocation management table;

DETAILED DESCRIPTION OF THE PREFERRED EMBODIMENT

Figure 1A:
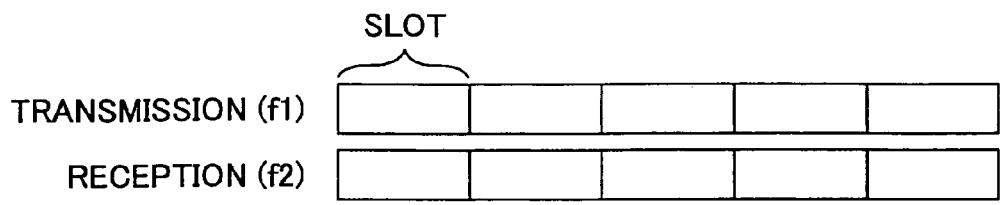
FIGS. 1A, 1B and 1C are diagrams to explain an overview of duplex schemes.
Figure 1B:
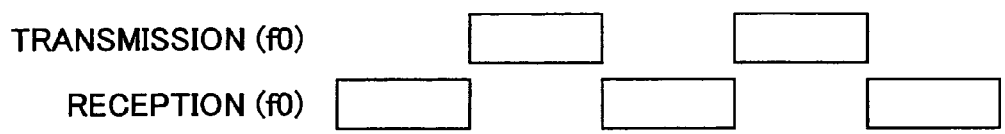
Figure 1C:

The present invention is described in detail below in conjunction with the attached drawings.

A communication system in an IP (Internet Protocol) network to which a slot allocation method according to an embodiment of the present invention is applied is configured as shown in FIG. 2, for example.

In this drawing, the communication system according to this embodiment has n mobile stations (mobile station A11, mobile station A12) and a base station 20 connected to the mobile station A11 and mobile station A12 via wireless communication links. The mobile station A11 and mobile station A12 are located within a radio zone the base station 20 forms (zone in which communication with a radio base station is available), and the mobile station A11 and mobile station A12 perform packet communication with the base station by a FDD/TDD scheme.

Further, the base station 20 is connected to ISP (Internet service provider) server 110, etc., via an IP network 100, and each mobile station accesses the Internet via the ISP server 110 to obtain various services such as a massive download or upload of data.

Next, an operation concept of the base station 20 in the communication system 1 configured as mentioned above is described in comparison with a method according to prior art. FIGS. 3A, 3B are diagrams showing a slot allocation method by the FDD/TDD scheme according to the present invention in contradistinction to prior art. FIG. 3A shows the slot allocation method by the FDD/TDD scheme according to prior art, and FIG. 3B shows the slot allocation method by the FDD/TDD scheme according to the present invention.

Since the slot allocation method by the FDD/TDD scheme according to prior art is optimized for traffic processing for line switching, the transmission timing and reception timing are uniquely determined. For example, if the base station 20 transmits the signal to the mobile station A11 of the destination (indicated [A (transmit)] in the drawing), the mobile station A11 receives the signal at a predetermined reception timing. The same goes for other mobile stations.

In other words, with the slot allocation method by the FDD/TDD scheme according to prior art, the timings of transmission and reception are fixed in the system, so it is not possible to implement flexible allocation.

The slot allocation method by the FDD/TDD scheme according to the present invention enables solving this problem. In other words, even in asymmetric communications where the transmission data don't arrive periodically at a certain rate, flexible allocation is achieved by shifting the timings of transmission and reception. For example, as shown in FIG. 3B, free slot allocation is implemented by allocating plural successive slots to the mobile station A11, allocating one slot to the mobile station A11, or allocating a slot addressed to the mobile station A12 between the successive slots addressed to the mobile station A11.

Next, several embodiments are described.

First Embodiment

At first, a configuration of a base station to which a slot allocation method based on the FDD/TDD scheme according to the first embodiment of the present invention is applied is explained. FIG. 4 is a function block diagram which shows an example of the configuration of the base station according to the present embodiment.

In this drawing, the base station 30 includes a buffering section 31 that retrieves information on quality of a communication service a user requires (hereafter, referred as to QoS information) based on header information of the data packet received, and outputs it to scheduling section 32; a scheduling section 32 that determines slot allocation for a downlink (down line) which is a propagation path from a base station to a mobile station and an uplink (up line) which is a propagation path from a mobile station to a base station based on the QoS information of the traffic supplied from the buffering section 31 and information on channel statuses (channel state information) of the respective users supplied via an uplink reception section 36 described below; a switching section 33 that outputs packets to a baseband signal processing section 34 by performing switching according to the instruction from the scheduling section 32; the baseband signal processing section 34 that applies a baseband process to the received packets; a wireless transmission section 35 that converts the baseband signal to a RF (radio frequency) signal, amplifies it and transmits it to the mobile station by a wireless link; and an uplink reception section 36 that estimates the channel statuses of the respective users based on the receive signals received from the mobile stations and outputs the estimation result to the scheduling section 32.

Figure 5:
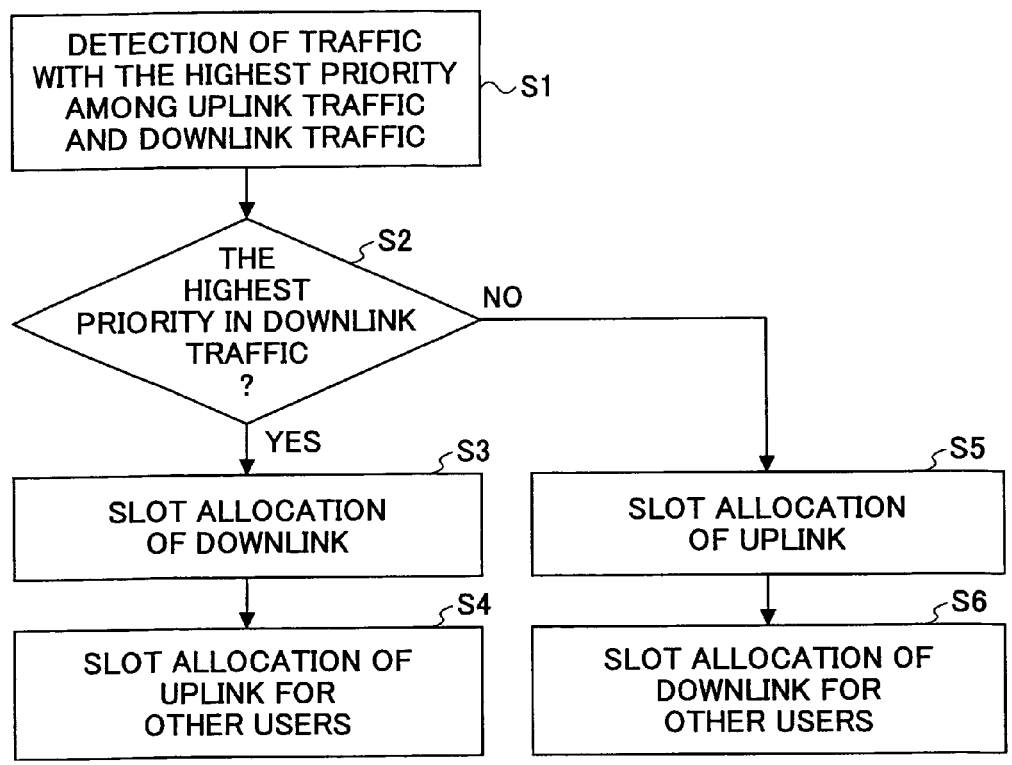
FIG. 5 is a flowchart showing an operational procedure of the base station in the first embodiment.

Next, the operation of the base station structured as above is explained, referring to a flowchart of FIG. 5. The base station according to this embodiment has a function of allocating the slots based on the Qos information such as permissible delay, information rate, etc. Here, QoS information includes, in addition to permissible delay (for example, VoIP, real-time traffic such as in dynamic picture image communications, real-time traffic of sequential reproduction type such as streaming, or non-real time traffic such as FTP), information rate, allowable or required IP loss rate (for example, in TCP, errors are misunderstood as congestion, resulting in reduction in transmission rate, so it is necessary to permit a delay in order to reduce error rate; whereas in VoIP, bit error rate of about $10^{-3}$ is permitted, because it is of no use if packets don't arrive in time), the amount of information (the amount of packets), user information (for example, users to which a higher priority should be given), and any combination thereof. In this example, for the sake of simplification, it is assumed that the permissible delay is included in the QoS information and the Qos is classified in accordance with strictness of the permissible delay.

In FIG. 5, as shown in step S1, when the scheduling section 32 of the base station receives a data packet addressed to the mobile station A transmitted from the ISP server (for example) of the IP network, the scheduling section 32 refers to header information of the received data packet to recognize the permissible delay (recognize the QoS class). In other words, the scheduling section 32 recognizes the QoS class of the downlink traffic.

Further, the scheduling section 32 recognizes the permissible delay of the transmission data (the QoS class) included in a reservation packet transmitted from the mobile station A according to a random access scheme. In other words, the scheduling section 32 recognizes QoS class of the uplink traffic. It is noted that the ID of the mobile station and the amount of the transmission data, etc., in addition to the QoS information of the transmission data are included in the reservation packet.

After recognizing QoS classes of the uplink/downlink traffic as mentioned above, the scheduling section 32 detects the traffic with the highest priority among the uplink/downlink traffic, based on the recognized QoS classes. Here, if the QoS class of the downlink traffic is '1' and the QoS class of the uplink traffic is '2' (in this example, value with a smaller number indicates a higher priority), then the downlink traffic is detected as the traffic with the highest priority.

In step S2, it is determined whether the traffic with the highest priority detected as mentioned above corresponds to the downlink. If it is determined that the downlink traffic is the traffic with the highest priority (step S2, Yes), a slot is allocated for the data packet of the downlink to be transmitted to the mobile station A on a priority basis (step S3). As a result of this, it becomes impossible to allocate the uplink slot for the mobile station A, so the scheduling section 32, in step S4, selects among other mobile stations (located in the same radio zone as the mobile station A) except the mobile station A a mobile station for which the transmission in the uplink is possible at the transmission timing of the allocated downlink slot for the mobile station A, and allocates the uplink slot for the selected mobile station.

On the other hand, if it is determined in the determination (step S2) that the traffic with the highest priority is the uplink traffic (No at S2), the scheduling section 32 allocates a slot for the data packet of the uplink to be transmitted from the mobile station A on a priority basis (step S5). Then, in step S6, the scheduling section 32 selects among other mobile stations except the mobile station A a mobile station for which the transmission in the downlink is possible at the transmission timing of the allocated uplink slot for the mobile station A, and allocates the downlink slot for the selected mobile station.

In this way, according to this embodiment, by shifting the timings of transmission and reception in accordance with the QoS demands of the uplink and downlink, the slot allocation for the mobile stations can be done flexibly in accordance with the status of the traffic, etc., and in particular, the traffic to which a higher priority should be given, such as traffic with strict permissible delay or traffic of high emergency, can be passed with reliability.

In addition, by promoting the flexible slot allocation, it becomes possible to utilize the radio resources of the base station effectively, because the slots are allocated in good balance.

Figure 6:
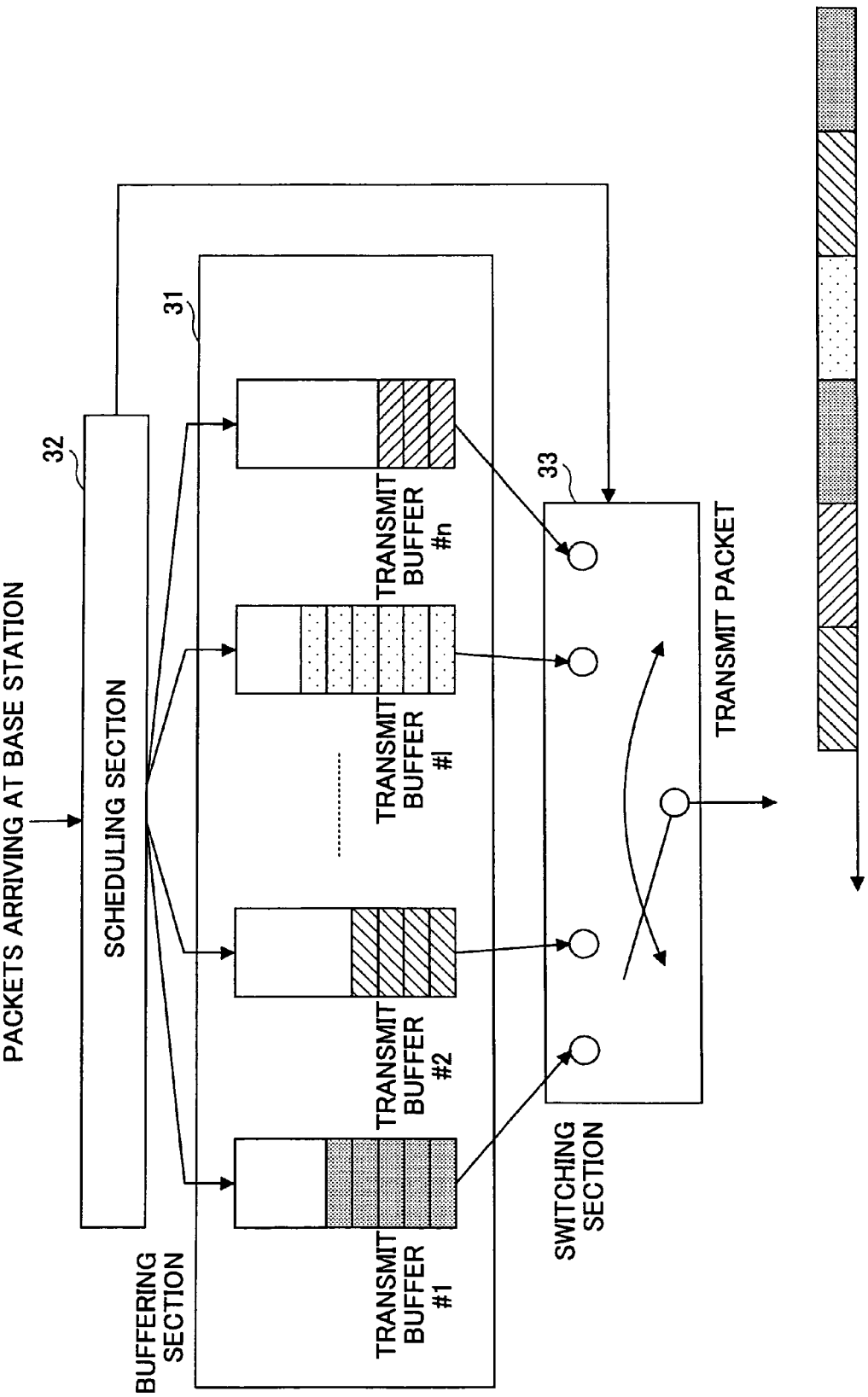
FIG. 6 is a schematic diagram to explain an operation example in a scheduling section for distributing data packets which have arrived at the base station to buffers.

FIG. 6 is a diagram for explaining an example of the operation in the scheduling section for dividing the data packets which have arrived at the base station among the buffers. Here, it is assumed that each buffer (each of the transmit buffers #1 to #n) in the buffering section 31 is prepared for a corresponding permissible delay class.

As shown in FIG. 6, in this embodiment, the scheduling section 32 checks the header of the data packet which has arrived at the base station to distinguish the permissible delay class, and then allocates the data packet to the buffer with the corresponding permissible delay class, based on the check result. It is noted that although the common buffers are prepared for all the users in this embodiment, it is possible to prepare the buffers with different permissible delay classes for every user. After the scheduling section 32 has finished allocation of the data packets to the buffers, the scheduling section 32 controls the switching in the switching section 33 to retrieve the data packets from the transmit buffers in such order that the data packet with the priority of the most strict permissible delay is retrieved first. The transmission data packet retrieved from the switching section 33 by switching under the control of the scheduling section 32 is supplied to the baseband signal processing section 34.

In this way, according to this embodiment, the data packets are allocated according to the permissible delay classes; however, the present invention is not limited to this way of allocation, and it is possible to perform the allocation of the data packets based on priority information from a negotiation result conducted in a higher layer.

Figure 7:
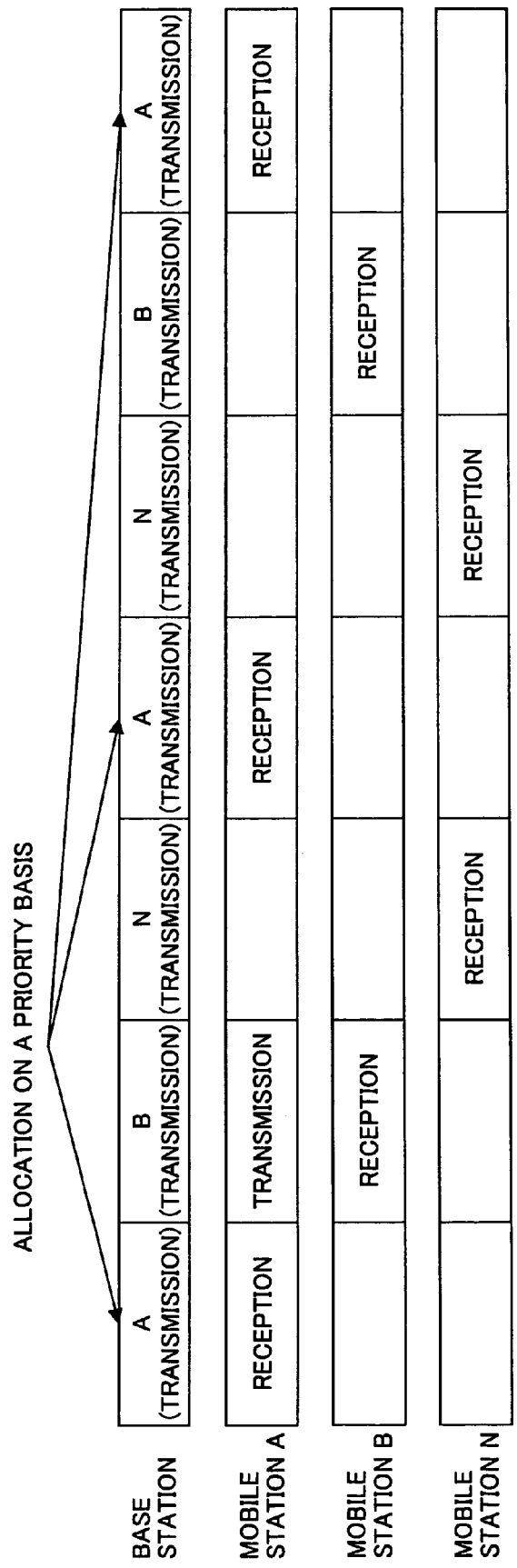
FIG. 7 is a diagram showing an example of a slot allocation in the base station according to the first embodiment (No. 1)
Figure 8:
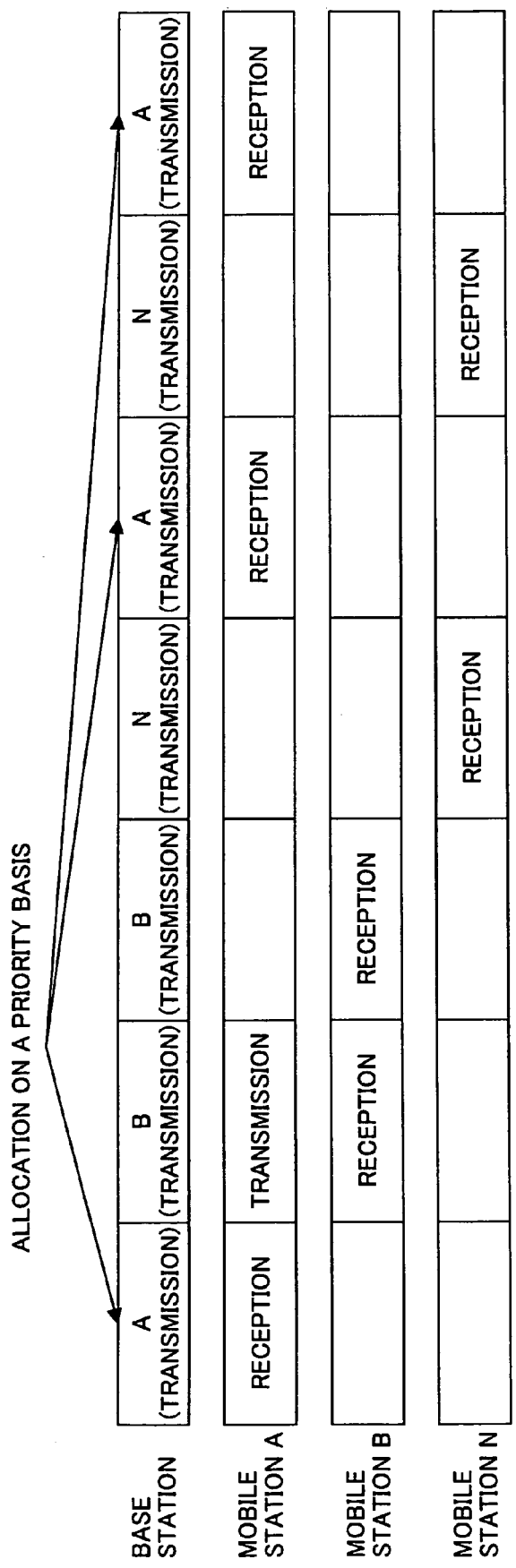
FIG. 8 is a diagram showing an example of a slot allocation in the base station according to the first embodiment (No. 2)

Next, an example of the slot allocation based on the aforementioned operation of the base station is explained referring to FIG. 7 and FIG. 8. FIG. 7 shows an example of the frame configuration in the case of the slot allocation performed periodically for the mobile station A. As shown in FIG. 7, in this embodiment, the base station allocates the downlink slot periodically (with the interval of 2 slots) for the mobile station A on a priority basis, based on the process result shown in FIG. 5. Further, during the interval of 2 slots, the downlink slots are allocated to other users (the mobile station B, and the mobile station N). It is noted that the "A (transmit)" in the slot in the base station indicates the transmission in the downlink to the mobile station A, the "transmit" in the slot in the mobile station indicates the transmission performed in the mobile station, and the "receive" indicates the reception.

FIG. 8 shows an example of the frame configuration in the case of the slot allocation performed non-periodically in accordance with the arrival of the data from the mobile stations. As shown in FIG. 8, in this embodiment, the base station allocates the downlink slot non-periodically for the mobile station A and the downlink slot for other users (the mobile station B, and the mobile station N) during the interval of the slots for the mobile station A, based on the process result shown in FIG. 5.

On the other hand, concerning the slot allocation for the uplink, the number of transmissions performed is not always the same as that of the receptions, because uplink traffic is different from that traffic in the downlink in general. Thus, as shown in FIGS. 7 and 8, the transmission subsequent to the reception is performed in some cases but not performed in other cases.

Second Embodiment

In the aforementioned embodiment, the base station detects among the uplink/downlink traffic the traffic to which the transmission with the class of the highest priority should be applied, and allocates slots to the detected link on a priority basis; however, the base station according to this embodiment has a function of giving a higher priority on the slot allocation for the downlink in advance.

Figure 9:
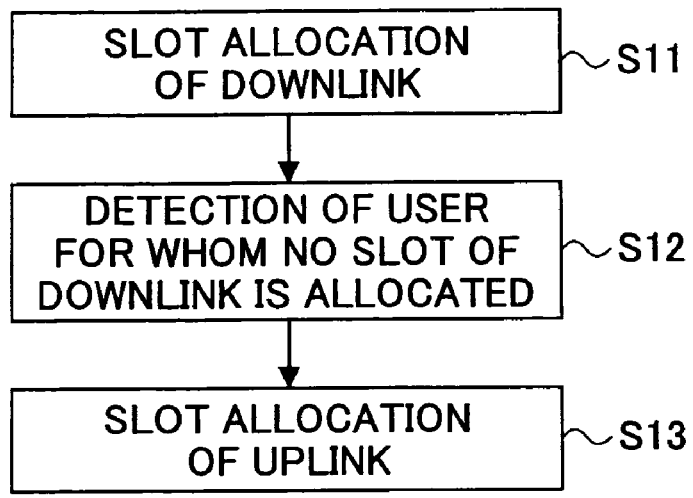
FIG. 9 is a flowchart showing an operational procedure of the base station according to the second embodiment (No. 1)

FIG. 9 is a flowchart which shows an operation of the base station according to this embodiment.

In this drawing, at first the base station determines the slot allocation for the downlink of a certain mobile station (for example, the mobile station A) in step S11. After that, in step S12 the mobile station detects, among other mobile stations except the mobile station A, a mobile station for which the uplink slot is not allocated at the transmission timing of the downlink slot for the mobile station A, and allocates the uplink slot for the detected mobile station in step S13. Here, in the case of the slot allocation for the downlink among the plural mobile stations, a higher priority may be given to the mobile station with a higher Qos demand for the downlink traffic.

In this way, according to this embodiment, since a higher priority is given to the downlink in advance, it becomes possible to implement the slot allocation suited for the users who want high-speed packet communication service in downlink and thus the provision of service that matches user's intent.

In addition, according to this embodiment, since the Qos of the uplink is not taken into account and the priority is given only to the downlink, the amount of processing in the base station can be reduced in comparison with the first embodiment, enabling miniaturization of the base station. Thus, for example, it is possible to use the base station according to this embodiment in a hot spot or a limited area such as a small conference hall where the number of users who want high-speed packet communication in downlink is limited.

In addition, the base station according to this embodiment has a function of giving a higher priority on the slot allocation for the uplink in advance.

Figure 10:
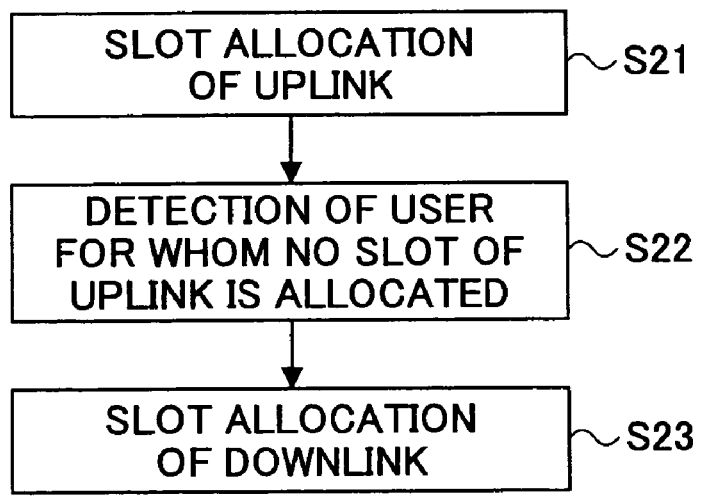
FIG. 10 is a flowchart showing an operational procedure of the base station according to the second embodiment (No. 2)

FIG. 10 is a flowchart which shows an operation of the base station according to this embodiment.

In this drawing, at first the base station determines the slot allocation for the uplink of a certain mobile station (for example, the mobile station A) in step S21. After that, in step S22 the mobile station detects, among other mobile stations except the mobile station A, a mobile station for which the downlink slot is not allocated at the transmission timing of the uplink slot for the mobile station A and allocates the downlink slot for the detected mobile station in step S23.

In this way, according to this embodiment, since a higher priority is given to the uplink in advance, it becomes possible to allocate the uplink slot for the users who want to upload a large amount of data on a priority basis and thus implement the provision of service that matches user's intent.

Third Embodiment

In the first embodiment, the manner in which the base station allocates the slot based on the Qos information is described; however, the base station according to this embodiment has a function of allocating the slots of the uplink and downlink based on propagation path information obtained from the uplink reception section 36 (see FIG. 4).

Although each mobile station cannot send out a control signal in the uplink during the reception in the downlink, at the timing when no allocation is performed each mobile station transmits propagation path information, such as reception status of the downlink or reception quality of packets, to the base station.

The uplink reception section 36 of the base station has a function of outputting the propagation path information transmitted as mentioned above to the scheduling section 32. Here, the propagation path information reported to the base station from the mobile stations is described. Propagation path information includes information on quality of reception (for example, reception SIR (Signal to Interference Ratio)), information representative of direction of arrival of users (DOA: Direction of arrival), information of users on uplink transmission power, delay spreading (time before the power of the delay wave through multi-path becomes lower than a certain power), Doppler frequency (reception frequency in the mobile station which shifts in accordance with the moving speed of the mobile station, etc.), the number of the propagation paths in multi-path, or any combination thereof. In this example, for the sake of simplification, it is assumed that the propagation path information includes the reception SIR.

Figure 11:
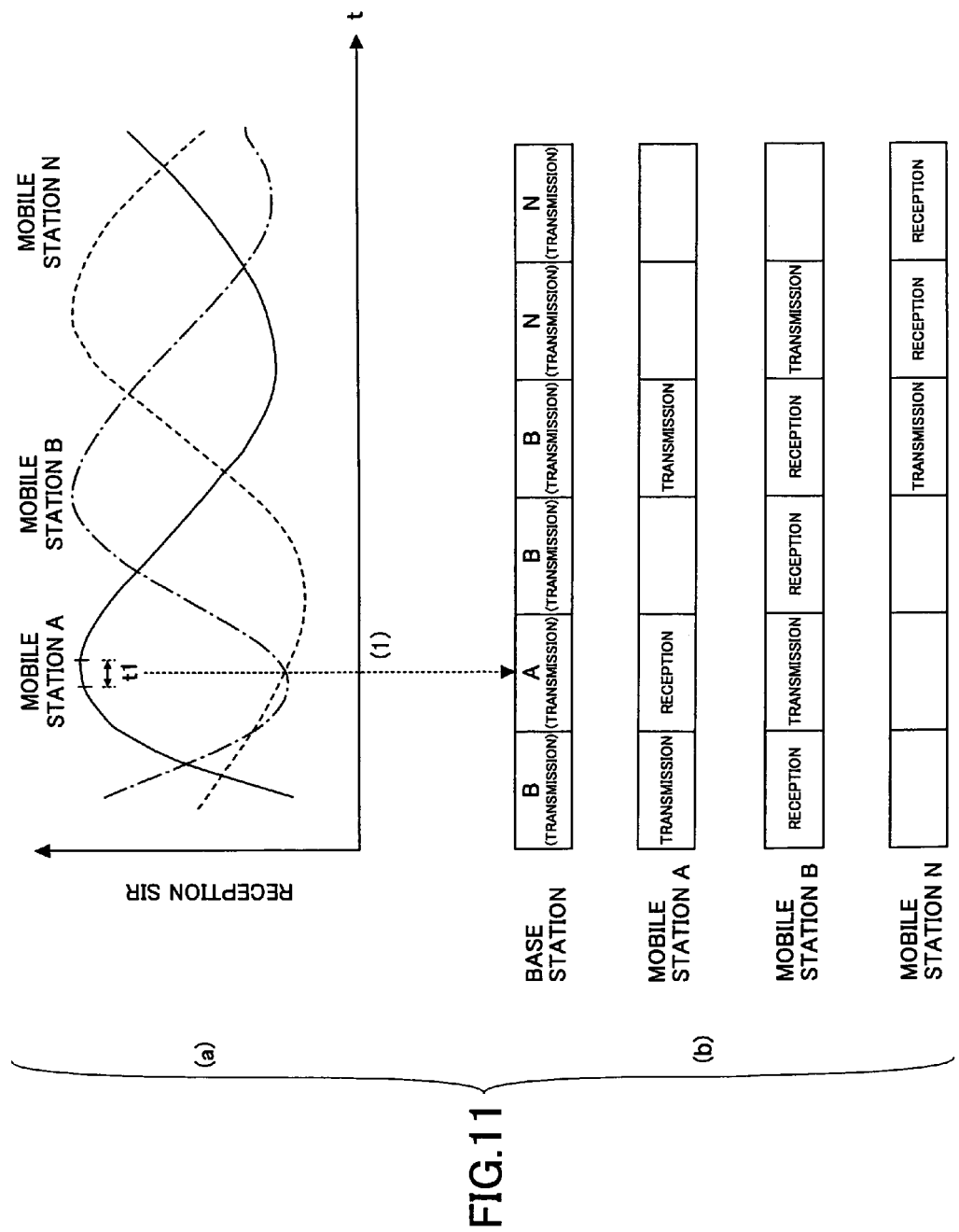
FIG. 11 is a diagram showing an example of a slot allocation for uplink and downlink in consideration of reception SIR according to the third embodiment.

FIGS. 11A and 11B are diagrams which show an example where the base station allocates the slots in consideration of the reception status (SIR) of each mobile station (each of mobile stations A-N). FIG. 11A shows the reception SIR of each mobile station, in which the reception SIR is represented by a vertical axis, and time (t) is represented by a horizontal axis.

In this embodiment, the base station acquires the reception SIR of each mobile station, gives a priority to the user with a particularly high reception SIR, and thus allocates the downlink slot for this user. Specific examples are explained hereafter.

The uplink reception section 36 of the base station monitors whether the reception SIR of the mobile station continues to exceed a predetermined value for more than a predetermined period. If it is determined that the reception SIR of the mobile station continues to exceed the predetermined value for more than the predetermined period, the uplink reception section 36 reports to the scheduling section 32 that the priority of the mobile station is the highest at present. Similarly, if it is determined that the reception SIR of the mobile station continues to fall short of a predetermined value for more than a predetermined period, the uplink reception section 36 reports to the scheduling section 32 that the priority of the mobile station is the lowest at present.

Once the scheduling section 32 recognizes the mobile station with the highest reception SIR or the mobile station with the lowest reception SIR at present based on the aforementioned reports, the scheduling section 32 allocates the downlink slot for the mobile station with the highest reception SIR.

For example, as shown in FIG. 11B, since the reception SIR of the mobile station A continues to exceed the predetermined value for the time period t1, the base station allocates the downlink slot for the mobile station A (1). At this time, the base station allocates the uplink slot for a mobile station (in this example, the mobile station B) other than the mobile station A.

In this way, according to this embodiment, since the channel status of the downlink is monitored, and when the channel status is good the slot allocation for the downlink is performed to transmit the data packet, it becomes possible to improve the reception characteristic in the mobile station and the system throughput.

It is noted that the mobile station whose reception SIR continues to exceed the predetermined value for more than the predetermined period is considered as the mobile station with the highest priority at present in this embodiment; however, such a determination method in which the mobile station whose reception SIR at a certain time exceeds the predetermined value is considered as the mobile station with the highest priority, or other determination methods may be used, as a matter of course.

Fourth Embodiment

In the first embodiment, the manner of the slot allocation based on the Qos information is described and the manner of the slot allocation based on the propagation path information is described; however, the base station according to this embodiment has a function of allocating the slots of the uplink and downlink based on both of the Qos information and the propagation path information.

The process performed by the base station according to this embodiment is the same as the process shown in FIG. 5; however, the process in step S1 differs in some points associated with consideration of both the Qos information and the propagation path information, so the different process in step S1 is described below.

Figure 12:
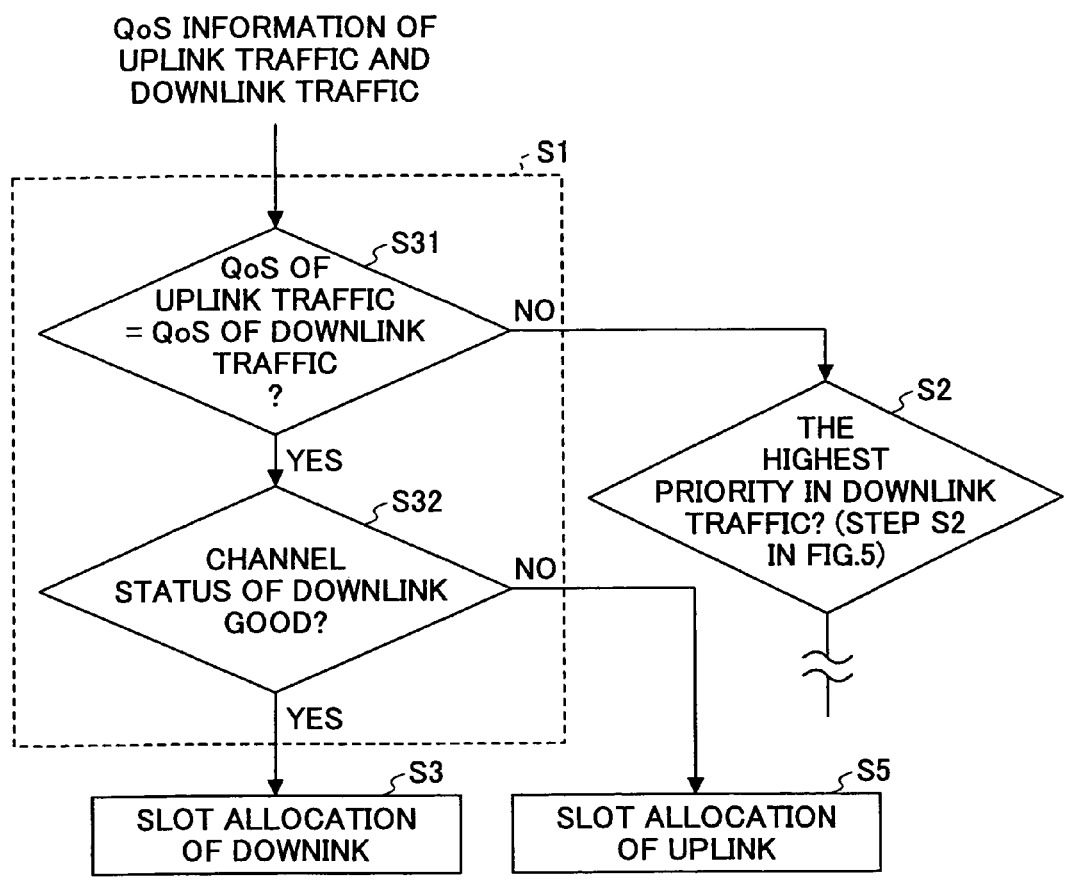
FIG. 12 is a flowchart showing a processing procedure to determine a slot allocation for uplink and downlink in consideration of two information items of QoS information and propagation path information according to the fourth embodiment.

FIG. 12 is a flowchart which shows a process for determining the slot allocation for the uplink and downlink in consideration of the two information items of the Qos information and the propagation path information.

In the drawing, the scheduling section 32 of the base station distinguishes the QoS classes of uplink/downlink traffic of a certain mobile station (in this example, the mobile station A), as is the case with the first embodiment, and determines whether the QoS class of downlink traffic has the same priority as the QoS class of uplink traffic (step S31). If it is determined that the QoS class of downlink traffic has the same priority as the QoS class of uplink traffic (step S31, Yes), the process continues to the next step in which it is determined whether the channel status of the downlink is good based on the propagation path information reported from the uplink reception section 36 (step S32). Here, the evaluation standard of the channel status is the same as in the case of the third embodiment.

If the scheduling section 32 determines that the channel status of the downlink is good (step S32, Yes), the scheduling section 32 allocates the downlink slot on a priority basis, as is the case with the processing of the step S3 shown in FIG. 5.

On the other hand, if it is determined in step S32 that the channel status of the downlink is bad (step S32, No), the scheduling section 32 allocates the uplink slot on a priority basis, as is the case with the processing of the step S5 shown in FIG. 5.

It is noted that if it is determined in step S31 that the QoS class of downlink traffic doesn't have the same priority as the QoS class of uplink traffic, the process continues to step S2 shown in FIG. 5 in which it is determined whether the traffic with the high priority corresponds to the downlink, followed by the processes shown in FIG. 5.

In this way, according to this embodiment, since the channel status is considered in addition to the information of QoS class, it is possible to perform the transmission of the downlink data packet properly when the channel status is good, improving reception quality of data with a high QoS demand.

In the aforementioned embodiments, the slot allocation for the mobile station based on the Qos information or the propagation path information, or the Qos information and the propagation path information is described; however, in the scheduling section 32 of the base station, a slot allocation management table of the uplink and downlink for each mobile station is referred to in allocating the slots of the uplink and downlink for the mobile stations. FIG. 13 is an example of the slot allocation management table.

In this drawing, column 200 of IDs of the mobile stations shows the ID numbers of the mobile stations used to uniquely recognize the mobile stations. In this example, ID numbers are simplified such as "A" for the mobile station A and "B" for the mobile station B. Columns 201, 202 show the QoS demand (QoS class) of the respective uplink/downlink traffic. Column 203 shows the channel status. Column 204 (ranking) shows the priorities of the users determined in consideration of the QoSs of the uplink and downlink and the channel status. In this example, 1 is higher than 2 concerning the ranking of the QoSs of the uplink and downlink and the channel status. Column 205 shows the allocation status of slots.

In this embodiment, as shown in the table, the QoS demands of uplink and downlink in both the mobile station A and the mobile station B traffic are the same, while the channel status in the mobile station A is better than the channel status in the mobile station B. In such a case, priorities are assigned such that the user with a good channel status is given the highest priority. The scheduling section 32 determines which of the mobile stations should be allocated the slots on a priority basis in accordance with the ranking (order) thus determined. In this example, since the ranking of the mobile station A is the highest, the scheduling section 32 determines that the slot allocation of downlink for the mobile station A should be given the highest priority. Then, the scheduling section 32 allocates the slot selected from the downlink slots available which can be transmitted at the earliest transmission timing for the data packet transmission to the mobile station A (see mark ○ in slots 1,2 in the drawing).

In addition, at that time, the scheduling section 32 allocates the uplink slot for the selected mobile station (except the mobile station A) for which the transmission in the uplink at the transmission timing of the slots (slots 1, 2) for the mobile station A is possible; however, this selection of the mobile station is performed in consideration of the aforementioned ranking. In this example, since the mobile station B has the second ranking after the mobile station A, the uplink transmission slot for the mobile station B is allocated at the desired transmission timing (in this example, slot 2) of the mobile station B (see the frame indicated by short dashes in the drawing).

In this way, according to this embodiment, since the users are classified by ranking and the slot allocation status for each mobile station is managed, it is possible to control the transmission and reception timings based on the slot allocation status. This enables avoiding interference between slots of the uplink and downlink and implements an effective slot allocation for the uplink and downlink in accordance with priority.

It is noted that the way of ranking users should not be limited to the aforementioned way. For example, it is possible to give a higher ranking to a user who uses more service provided, or give rankings referring to data such as use histories.

Fifth Embodiment

Figure 14:
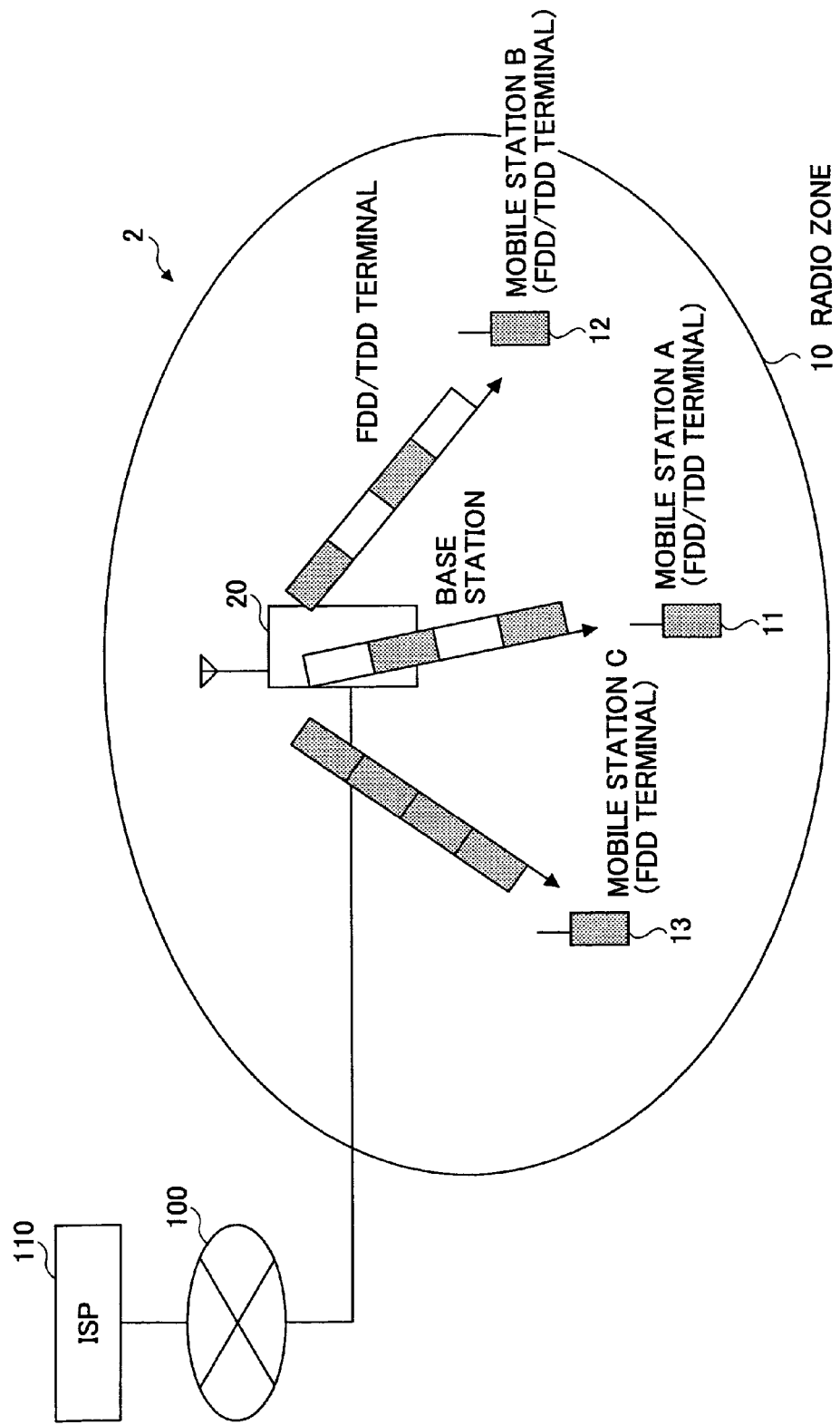
FIG. 14 is a schematic diagram showing the configuration of a communication system in the case of an FDD terminal and FDD/TDD terminals coexisting in the same radio zone according to the fifth embodiment.

In the aforementioned embodiments, the manner of the slot allocation of uplink and downlink for the mobile stations (FDD/TDD terminals) that perform wireless communications with the base station using the FDD/TDD scheme is described; however, such a situation is also conceivable where the mobile station C13 (FDD terminal: terminal with a capability to perform transmission and reception simultaneously) that performs wireless communications with the base station using the FDD scheme is located and mixed in the same radio zone 10, such as system 2 as shown in FIG. 14.

Figure 15:
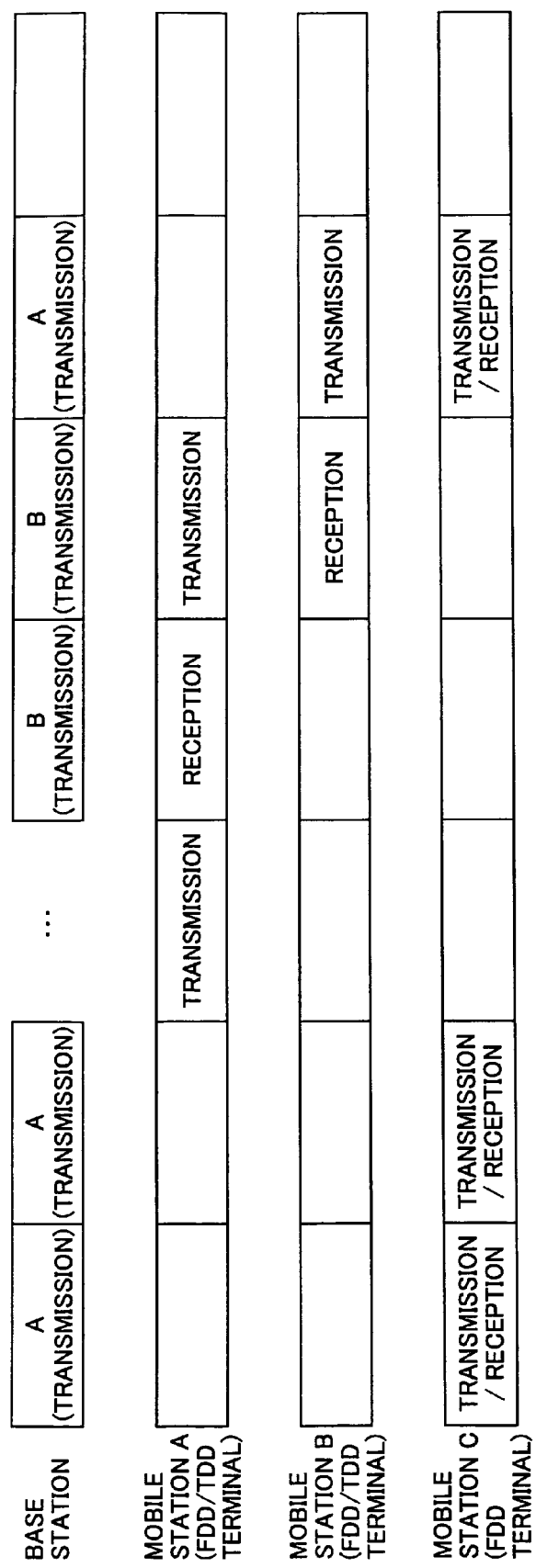
FIG. 15 is a diagram showing an example of a slot allocation in a coexistence system of FDD/TDD terminals and FDD terminals.

FIG. 15 is a diagram which shows an example of the slot allocation in the case of the slot allocation method of the present invention being applied to a coexistence system with a mobile station C (an FDD terminal) as shown in FIG. 14. As shown in FIG. 15, since the mobile station C13 is able to simultaneously perform transmission and reception, at the transmission timing of the slot for the mobile station A, the allocation of the uplink slot for the mobile station C is possible while the allocation of the uplink slot for the mobile station B is not possible.

In this way, according to this embodiment, it is possible to prevent capacity degradation of the base station in the coexistence system with the FDD terminals.

The present invention is disclosed with reference to the preferred embodiments. However, it should be understood that the present invention is not limited to the above-described embodiments, and variations and modifications may be made without departing from the scope of the present invention.

[Variants of the Present Invention]

In the aforementioned embodiments, the manner in which the data packets are allocated to the uplink and downlink slots using the slot allocation method according to the present invention is described; however, the slot allocation method according to the present invention is not limited to this kind of application. For example, it is applicable to the transmission of control signals. Here, a coexistence system with an FDD terminal is explained as an example.

Figure 16:
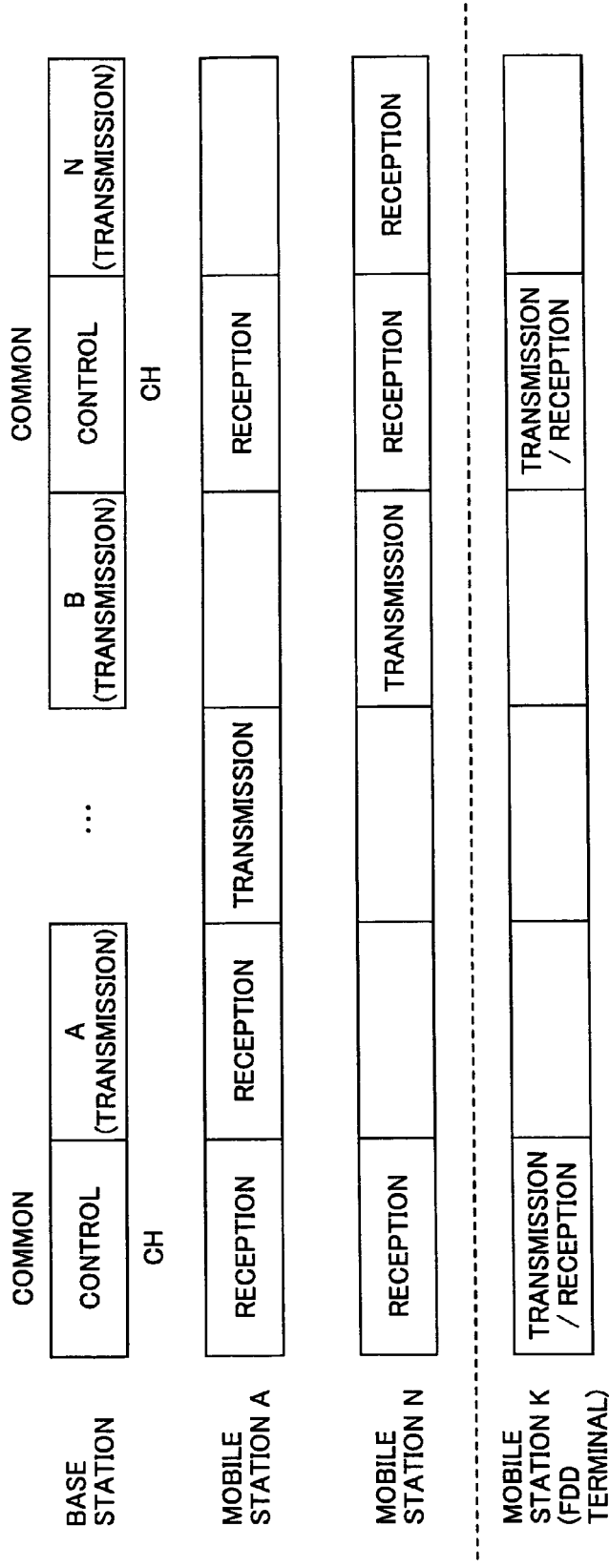
FIG. 16 is a diagram showing an example of control signal transmission.

FIG. 16 is a diagram which shows an example of the transmission of the control signal according to the present embodiment. As explained above, according to the FDD/TDD scheme, it is not possible to simultaneously perform transmission and reception. Since the common control channel transmitted from the base station to the mobile station is information reported to all the users, the common control channel is inserted periodically by the base station according to the FDD/TDD scheme.

As shown in this drawing, in the present embodiment, when the base station transmits the common control channel in the downlink, it is not possible to perform the transmission in the uplink, because users (the mobile station A to the mobile station N) of all FDD/TDD terminals become in the reception state. In this case, although the capacity of the uplink is reduced to some extent, there is no capacity degradation in the downlink. In other words, in the present embodiment, when the mobile station C (FDD terminal) coexists with the mobile stations A and B (FDD/TDD terminals), the base station allocates the uplink slot for the mobile station C at the timing of the common control downlink channel transmission. In this way, the mobile station C can transmit data while receiving the common control channel, enabling the prevention of capacity degradation in the downlink.

Figure 17:
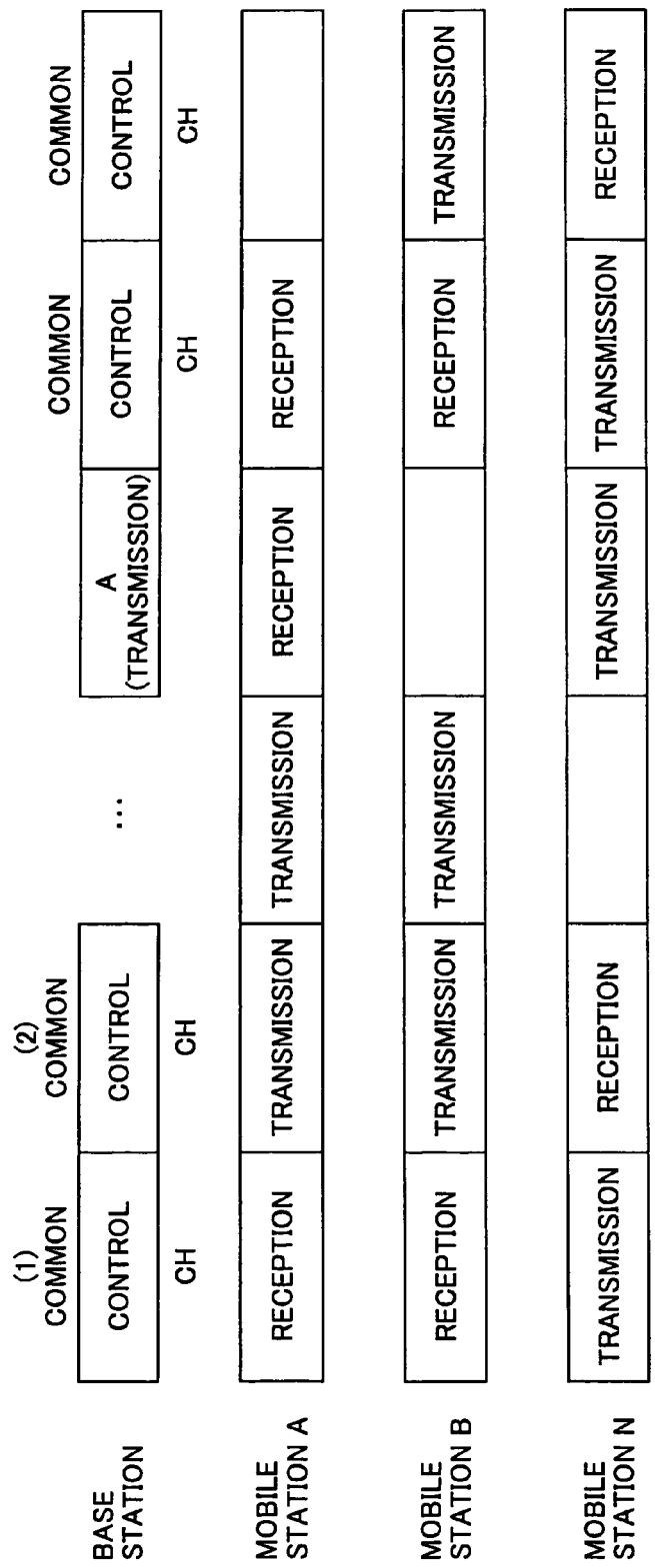
FIG. 17 is a diagram showing the case where a common control channel is transmitted consecutively.

Although the manner in which one common control channel is transmitted using the slot allocation method according to the present invention is described in the present embodiment, plural common control channels may be transmitted. FIG. 17 shows the case where the common control channel is transmitted consecutively by plural timings, assuming that only FDD/TDD terminals are in the same radio zone.

As shown in this drawing, according to the present invention, the mobile stations A to N may receive one of the plural common control channels transmitted by the base station. In this example, the mobile station A and the mobile station B receive a common control channel transmitted from the base station at the timing (1), while the mobile station N receives a common control channel transmitted from the base station at the timing (2). Thus, the mobile station N can perform the transmission in the uplink at the timing (1), for example.

In this way, according to the present invention, by transmitting a common control channel by plural timings, it is possible to reduce capacity degradation in the uplink, though the capacity of the downlink is reduced.

It is noted that the manner in which the common control channel is transmitted for two slots in a row is described; however, the common control channel is not necessarily transmitted in succession, if the information reported by the common control channel is of low importance. In this case, the base station is configured to determine the intermittent reception timing in each of the mobile stations so as to not allocate the common control channel at the reception timing.

In addition, although the way in which the transmission for one user is performed in one slot is described in the embodiments (including variants), the present invention should not be limited to this way. For example, plural users may be multiplexed in one slot.

Figure 18:
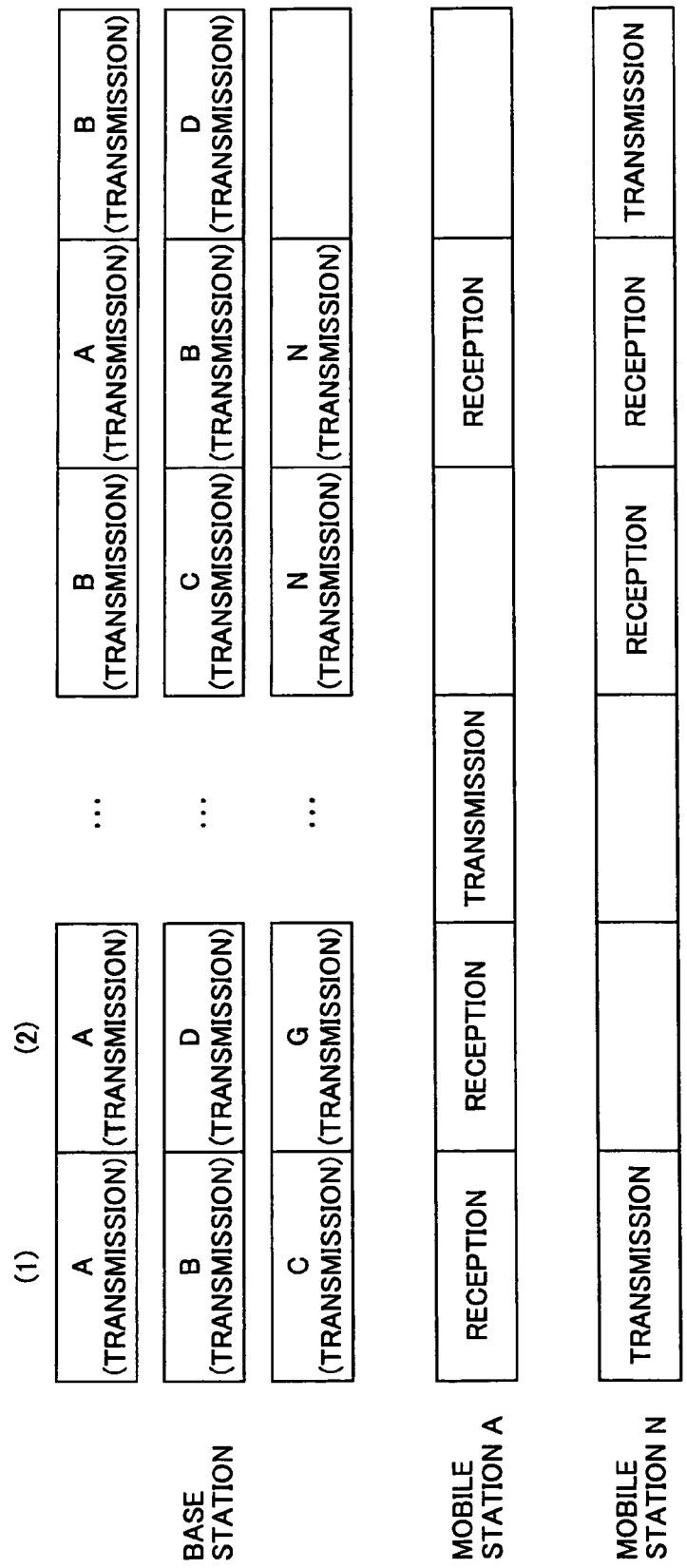
FIG. 18 is a diagram showing the case where plural signals of users are multiplexed in the base station to be transmitted in one slot.

FIG. 18 is a diagram showing the case where the transmission is performed with the plural users multiplexed in one slot in the base station according to the FDD/TDD scheme.

In the present embodiment, the base station detects the downlink traffic addressed to the mobile station with a high priority, selects users to be multiplexed in one slot based on the detection result and multiplexes them. In the example in FIG. 18, the case is illustrated where in the first slot (1) from left are multiplexed users of the mobile station A, the mobile station B and the mobile station C, and in the second slot (2) from left are multiplexed users of the mobile station A, the mobile station D and the mobile station G.

Although the case where the signals of the different users of the mobile station A, the mobile station B and the mobile station C are multiplexed in the slot (1) is described here as an example, it is also possible to multiplex only the mobile station A at the aforementioned slot timing (1). In other words, the multiplexing number for each user can be varied flexibly in accordance with priority, etc.

Figure 19:
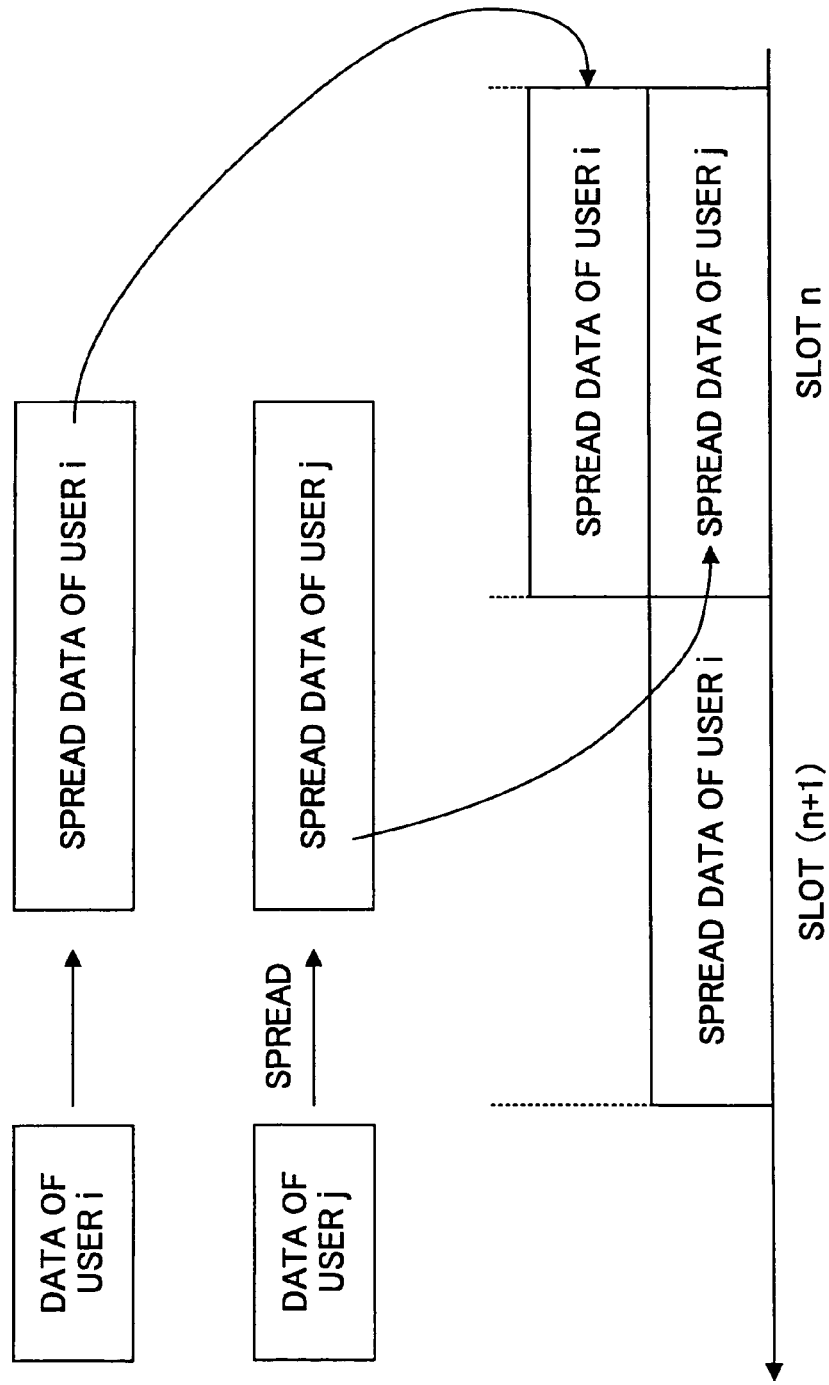
FIG. 19 is a diagram showing a principle of user multiplexing based on a CDMA-FDD/TDD scheme.

Next, a principle of user multiplexing based on CDMA-FDD/TDD scheme is illustrated in FIG. 19, which is an example of the aforementioned principles of the multiplexing method. In this embodiment, the base station has a function of multiplexing users using different spread codes.

As shown in FIG. 19, the base station spreads the respective data of the user i and user j using a spreading technique (used in CDMA) and then multiplexes them in one slot, whereby transmission in the same slot is enabled. In this example, spreading factors for the user i and user j are the same; however, the spreading factors are not necessarily the same. For example, the respective spreading factors may be 4, 8 or 4, 32. The reception party can retrieve only its own signal by examining the correlation with its own spreading codes. It is noted that the spreading factors may be varied in accordance with the information rate.

Figure 20:
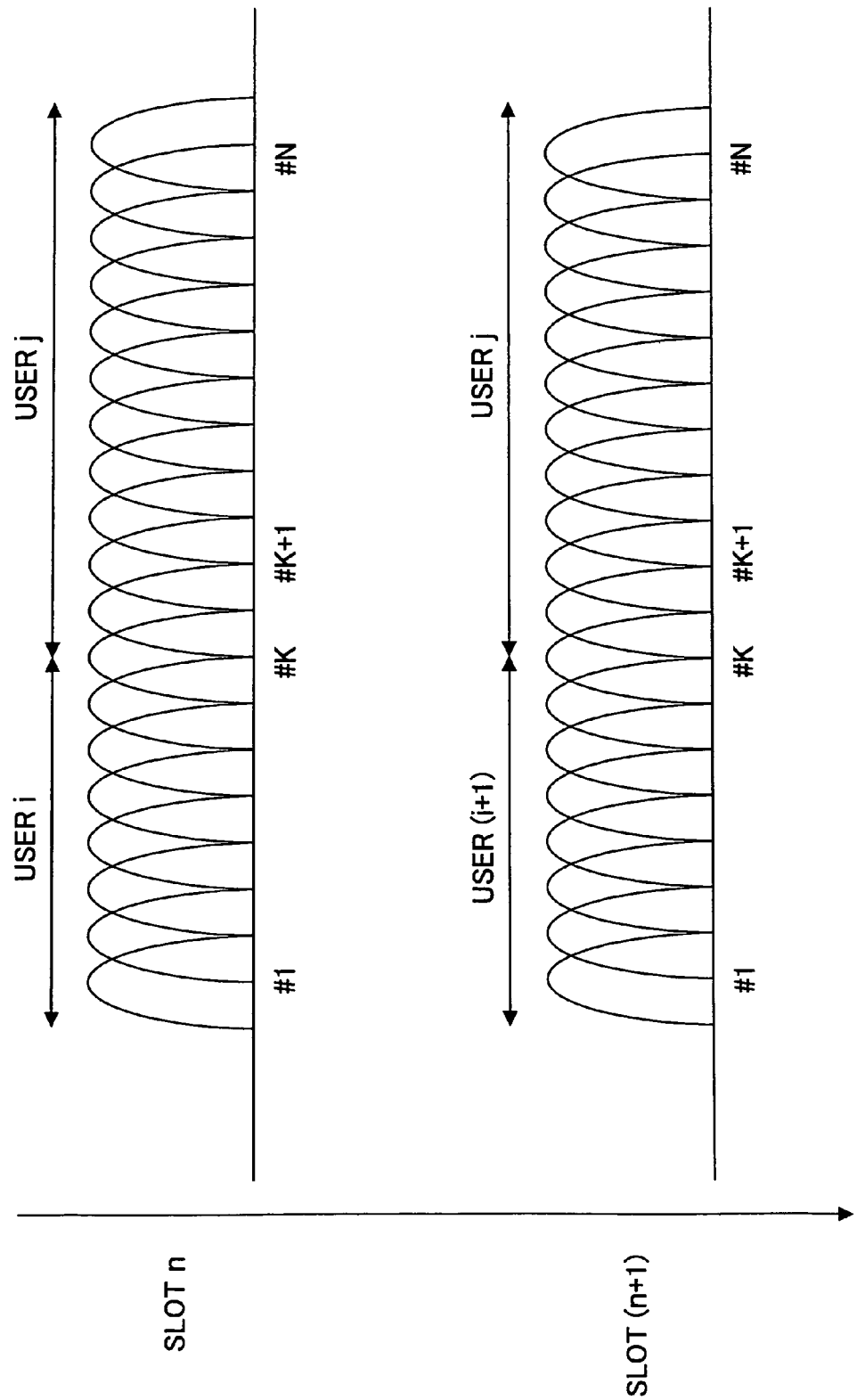
FIG. 20 is a diagram showing a principle of user multiplexing based on a multi-carrier-FDD/TDD scheme.

On the other hand, FIG. 20 shows a principle of user multiplexing based on a multi-carrier-FDD/TDD scheme, and shows an example of multiplexing on the sub-carriers in a frequency direction. In this embodiment, the base station has a function of multiplexing users using different sub-carriers.

As shown in this drawing, with respect to the slot n, the base station allocates the sub-carriers # 1~# K to the user i and the sub-carriers # K+1~# N to the user j. In this example, the manner in which the sub-carriers are divided in succession is illustrated; however, the successive sub-carriers are not necessarily allocated. For example, the sub-carriers # 1,# 3,# 5,# 7, . . . may be allocated for the user i while the sub-carriers # 2,# 4,# 6,# 8, . . . may be allocated for the user j.

As mentioned above, according to the example shown in FIG. 18 through FIG. 20, since plural users can be multiplexed in one slot by using spread codes or part of the carrier, it is possible to perform effective transmission in one slot with various information rates and various amounts of information. Further, it is possible to easily control fairness between users by multiplexing or not multiplexing in accordance with the channel status of each user.

By the way, in a system such as IMT-2000 adopting an FDD scheme (W-CDMA, cdma2000), HSDPA (High-Speed Downlink Packet Access) which is a extended version of IMT-2000 (W-CDMA, cdma2000) or cdma2000 EV/DO, transmission power control (Transmission Power Control: TPC) for minimizing necessary transmission power of the mobile stations in order to solve a far-and-near problem.

Figure 21:
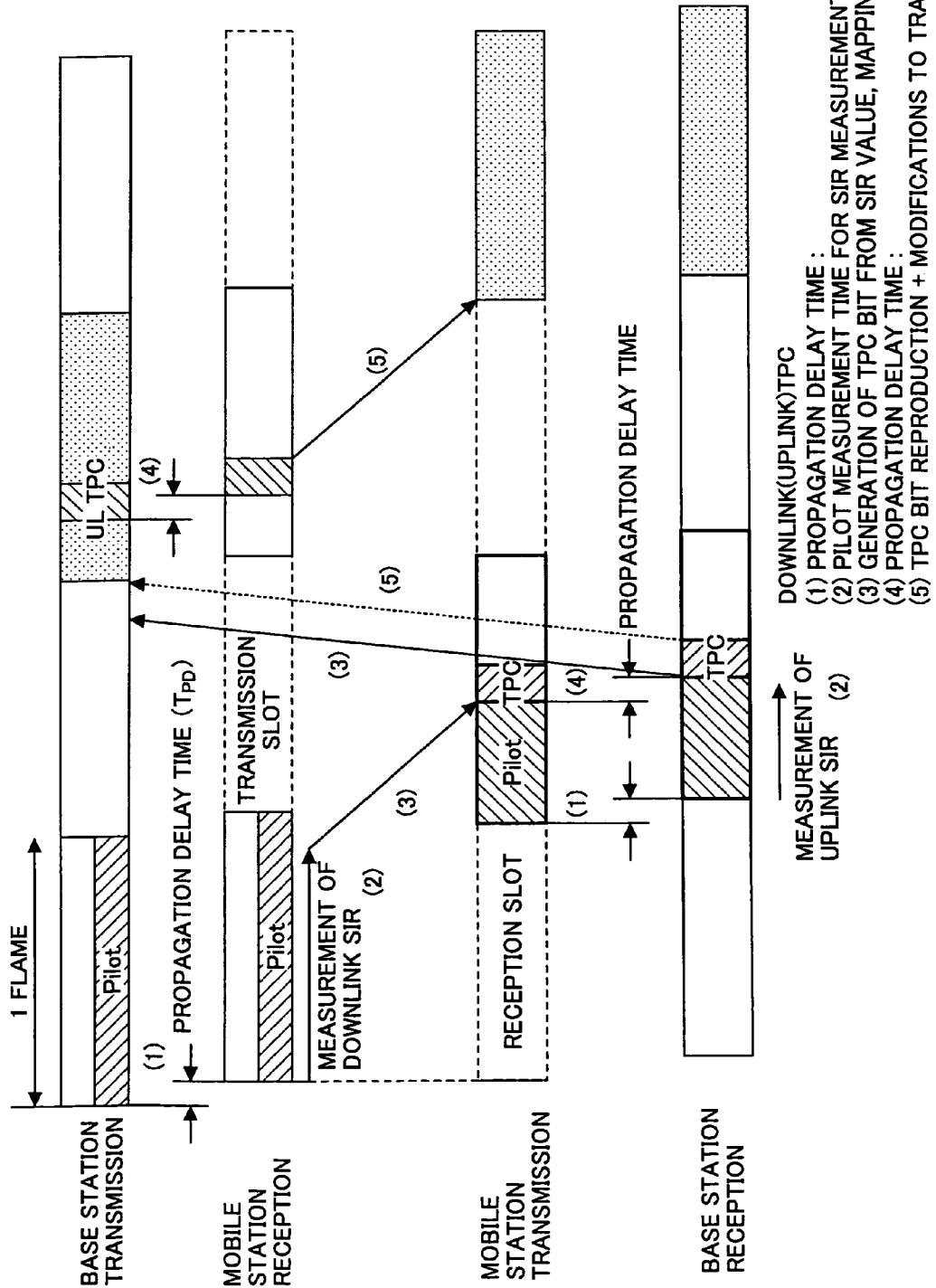
FIG. 21 is a diagram showing an example of an operation in the case of transmission power control applied to the base station of the FDD/TDD scheme according to an embodiment of the present invention.

FIG. 21 is a diagram which shows an example of an operation in the case of the transmission power control being applied to the base station of the FDD/TDD scheme according to the embodiment of the present invention.

In FIG. 21, at reference symbol (1), a pilot signal for SIR measurement transmitted to the mobile station from the base station is received by the mobile station through propagation delay time ($T_{PD}$). At reference symbol (2), the mobile station measures the SIR using the received pilot signal. At reference symbol (3), the mobile station generates a TPC bit (for example, an instruction to reduce the transmission power for the mobile station if the SIR measurement is larger than a desired value) and transmits it by mapping it in the frame. The base station receives the TPC bit transmitted from the mobile station through propagation delay time (at reference symbol (4)), and reproduces the TPC bit to control the transmission power (at reference symbol (5)). In this way, it becomes possible to apply transmission power control in the base station of the FDD/TDD scheme in which the transmission and reception timings are different. In particular, it is possible to ensure system capacity in the case of the transmission data being transmitted inflexibly at a uniform rate as is the case with line switching.

Figure 22:
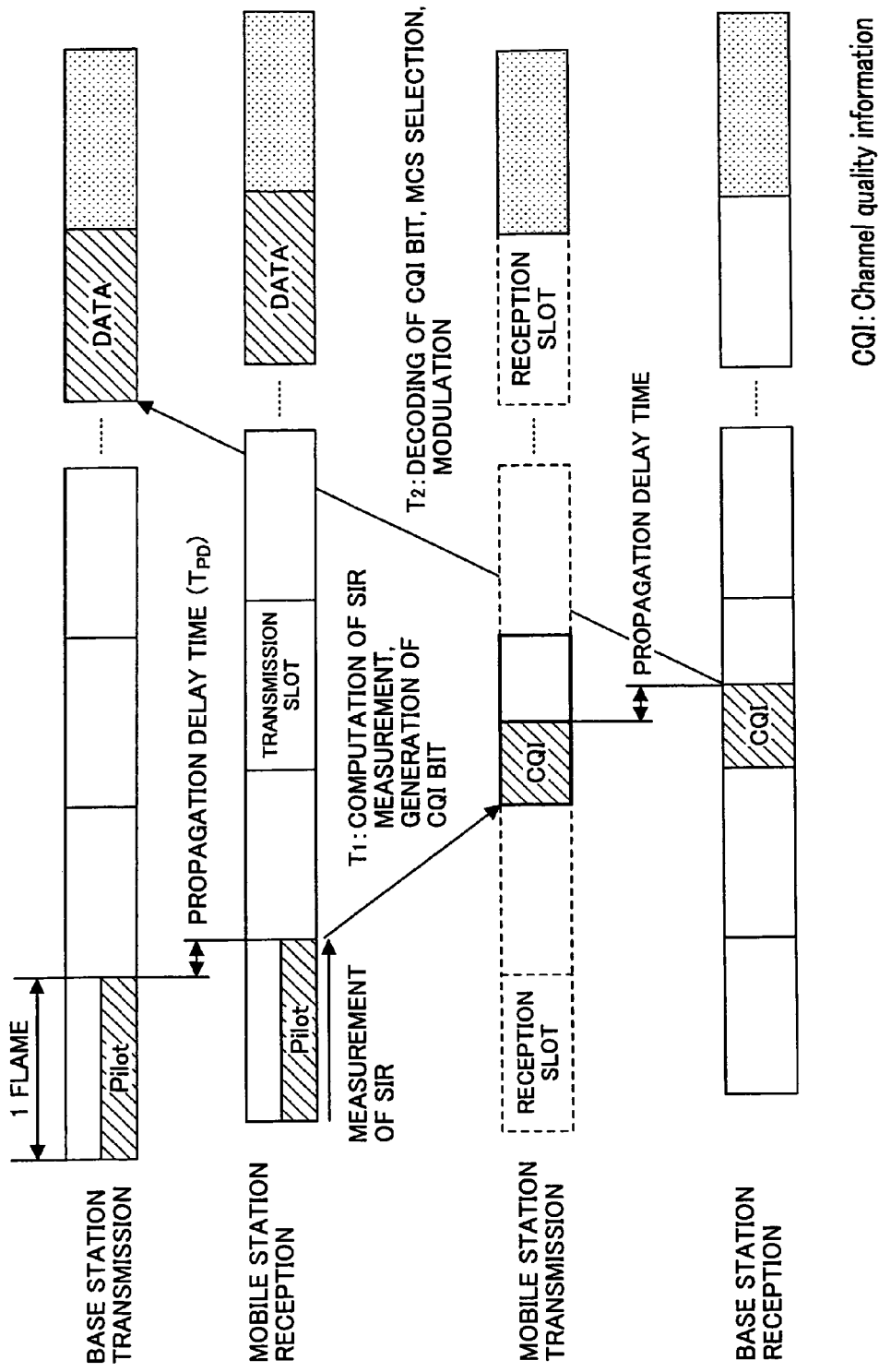
FIG. 22 is a diagram showing an example of an operation in the case of AMC technology applied to the base station of the FDD/TDD scheme according to an embodiment of the present invention.

Further, in HSDPA according to the FDD scheme, adaptive modulation and channel coding (AMC) technology in which QPSK (Quadrature Phase Shift Keying) which operates in a low speed is used as a modulation scheme when a wave reception state is not good, while 16QAM (16 Quadrature Amplitude Modulation) which operates in a high speed is used as a modulation scheme when a wave reception state is good, and Hybrid ARQ (Automatic Repeat reQuest) technology which is a combination of the existing ARQ (Automatic Repeat Request) and error correction codes are used. FIG. 22 is a diagram which shows modulation scheme selection control procedure in the case of the AMC technology being applied to the base station of the FDD/TDD scheme according to an embodiment of the present invention.

In FIG. 22, the mobile station receives a pilot signal transmitted from the base station, and measures SIR. The mobile station generates a CQI (Channel quality information) bit and transmits it by mapping it in the frame. The base station decodes the received CQI bit, selects a modulation/coding scheme (MCS (Modulation and coding scheme) selection), and allocates the transmission data modulated/encoded according to the selected modulation/coding scheme to the slot.

In this way, according to the present embodiment, it is possible to flexibly allocate slots according to the channel status by applying the aforementioned AMC in the base station of the FDD/TDD scheme. In other words, the present embodiment illustrates the case where CQI is used as propagation path information in the aforementioned third embodiment.

In addition, it is possible to reduce control delay by putting a control bit of CQI or TPC in an appropriate position of the slot, thereby improving estimation accuracy in estimated signal for control. Furthermore, as a variant of the present invention, the channel status may be estimated based on the TPC bit, and slots may be allocated based on the estimation result.

This patent application is based on and claims the benefit of the earlier filing date of Japanese Patent Application No. 2004-233673 filed Aug. 10, 2004, the entire contents of which are hereby incorporated by reference.

What is claimed is:

1. A slot allocation apparatus for allocating slots in communicating with plural mobile stations in accordance with a Frequency Division Duplex/Time Division Duplex (FDD/TDD) scheme, the slot allocation apparatus comprising:
   traffic property detecting means for detecting a property of input traffic;
   slot allocation priority determining means for determining which of an uplink slot and a downlink slot should be given a higher priority for slot allocation based on a priority of the input traffic derived from the detected property of the input traffic; and
   slot allocating means for allocating between the uplink and downlink slots for the mobile stations based on a determination result from the slot allocation priority determining means,
   wherein separate frequencies are used exclusively and simultaneously for uplink and downlink communications with the plural mobile stations independent of volume conditions between the uplink and downlink communications.

2. The slot allocation apparatus of claim 1, wherein the traffic property detecting means are adapted to input uplink and downlink traffic as the input traffic, and detect the priority of the input traffic based on quality of service demanded by the corresponding input traffic.

3. The slot allocation apparatus of claim 2, wherein the quality of service is represented by allowable delay time, allowable or required IP loss rate, information rate, amount of information, user information, performance of the party on the other end, or any combination thereof.

4. The slot allocation apparatus of claim 1, further comprising:
   channel status estimating means for estimating a channel status based on a signal received from the mobile station;
   wherein the slot allocation priority determining means are adapted to consider quality of service and the channel status in determining which of the uplink and downlink slots should be given a higher priority for the slot allocation.

5. The slot allocation apparatus of claim 4, wherein if the uplink and downlink are of the same priority concerning the input traffic, the downlink is given a higher priority for the slot allocation in the case of the channel status being estimated to be good, while the uplink is given a higher priority for the slot allocation in the case of the channel status being estimated to be bad.

6. The slot allocation apparatus of claim 4, wherein the channel status is represented by quality of reception, direction of arrival from the mobile station, uplink transmission power, delay spreading, Doppler frequency, multi-path number, or any combination thereof 7. The slot allocation apparatus of claim 4, wherein transmission power control, adaptive modulation control, automatic repeat and request control or any combination thereof is applied in allocating the uplink and downlink slots for the mobile stations.

8. The slot allocation apparatus of claim 4, wherein the slot allocating means are adapted to allocate plural users to the same slot using spread codes used in CDMA transmission or sub-carriers used in multi-carrier transmission, in allocating slots for the uplink and downlink communications with the plural mobile stations.

9. The slot allocation apparatus of claim 1, wherein transmission power control, adaptive modulation control, automatic repeat and request control or any combination thereof is applied in allocating the uplink and downlink slots for the mobile stations.

10. The slot allocation apparatus of claim 1, wherein the slot allocating means are adapted to allocate plural users to the same slot using sub-carriers used in multi-carrier transmission, a part of the bandwidth in whole band, or spread codes used in CDMA transmission in allocating slots for the uplink and downlink communications with the plural mobile stations.

11. The slot allocation apparatus of claim 1, further comprising:

means for allocating more than one downlink slot in succession for a common control channel.

12. The slot allocation apparatus of claim 1, wherein said slot allocation apparatus is able to communicate with a FDD scheme-applied mobile station, further comprising:

means for allocating the uplink slot to the FDD scheme applied mobile station at the timing of the downlink slot of a common control channel being allocated for the FDD/TDD scheme-applied mobile station, in the case where the FDD scheme-applied mobile station and the FDD/TDD scheme-applied mobile station are mixed in a predetermined radio zone.

13. A slot allocation method for a mobile communication system in which communication between a mobile station and a base station is performed in accordance with a Frequency Division Duplex/Time Division Duplex (FDD/TDD) scheme, the method comprising:

inputting uplink and downlink traffic to recognize quality of service demanded by the corresponding input traffic;

detecting priority of the input traffic based on the quality of service recognition;

determining which of an uplink slot and a downlink slot should be given a higher priority for the slot allocation based on the detected priority of the input traffic; and allocating the uplink slot or the downlink slot for the mobile station based on the determining step result, wherein separate frequencies are used exclusively and simultaneously for uplink and downlink communications between the mobile station and the base station independent of volume conditions between the uplink and downlink communications.

* * * * *